US011980812B2

(12) United States Patent
Wu

(10) Patent No.: US 11,980,812 B2
(45) Date of Patent: May 14, 2024

(54) CLOUD GAMING BY STREAMING VIDEO DATA ON PLAYBACK DEVICE

(71) Applicant: Tencent Technology (Shenzhen) Company Limited, Guangdong (CN)

(72) Inventor: Fengkai Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/244,617

(22) Filed: Sep. 11, 2023

(65) Prior Publication Data

US 2023/0415037 A1 Dec. 28, 2023

Related U.S. Application Data

(63) Continuation of application No. PCT/CN2022/137876, filed on Dec. 9, 2022.

(30) Foreign Application Priority Data

Mar. 18, 2022 (CN) .......................... 202210271200.5

(51) Int. Cl.
*A63F 13/355* (2014.01)
*A63F 13/52* (2014.01)
(Continued)

(52) U.S. Cl.
CPC ............ *A63F 13/355* (2014.09); *A63F 13/52* (2014.09); *H04N 21/6437* (2013.01); *H04N 21/6547* (2013.01); *H04N 21/8173* (2013.01)

(58) Field of Classification Search
CPC ... A63F 13/355; A63F 13/52; H04N 21/6437; H04N 21/6547; H04N 21/8173
See application file for complete search history.

(56) References Cited

U.S. PATENT DOCUMENTS

| 2005/0223107 | A1* | 10/2005 | Mine | H04L 65/1101 |
| | | | | 709/231 |
| 2014/0143437 | A1* | 5/2014 | Mathur | H04N 21/6581 |
| | | | | 709/231 |

(Continued)

FOREIGN PATENT DOCUMENTS

| CN | 112135199 A | 12/2020 |
| CN | 113794909 A | 12/2021 |

(Continued)

OTHER PUBLICATIONS

International Search Report and Written Opinion dated Mar. 2, 2023 in Application No. PCT/CN2022/137876, with English Translation, pp. 1-20.

*Primary Examiner* — William H McCulloch, Jr.
*Assistant Examiner* — Ankit B Doshi
(74) *Attorney, Agent, or Firm* — ARENTFOX SCHIFF LLP

(57) ABSTRACT

A streaming method executed by a control device includes receiving a streaming media playback address of a cloud streaming service returned by a cloud device, and transmitting a media projection request corresponding to a local media file stored on the control device to a playback device. The method further includes transmitting a loading instruction indicating to start loading the virtual scene to the cloud device, generating initial file parameters corresponding to the local media file and replacing a file address of the local media file in the initial file parameters with the streaming media playback address to obtain modified file parameters. The method further includes returning the modified file parameters to the playback device, the modified file parameters providing the streaming media playback address instead of the initial file parameters corresponding to the local media file.

20 Claims, 14 Drawing Sheets

(51) Int. Cl.
  *H04N 21/6437*   (2011.01)
  *H04N 21/6547*   (2011.01)
  *H04N 21/81*     (2011.01)

(56)  References Cited

U.S. PATENT DOCUMENTS

| | | | |
|---|---|---|---|
| 2016/0127440 A1* | 5/2016 | Gordon | H04L 65/80 |
| | | | 709/219 |
| 2017/0353516 A1* | 12/2017 | Gordon | H04L 65/80 |
| 2017/0353768 A1* | 12/2017 | Muvavarirwa | H04N 21/234309 |
| 2019/0069004 A1* | 2/2019 | Badawiyeh | H04N 21/2383 |
| 2021/0208842 A1* | 7/2021 | Cassidy | G11B 27/28 |

FOREIGN PATENT DOCUMENTS

| | | |
|---|---|---|
| CN | 114007143 A | 2/2022 |
| WO | 2016197863 A1 | 12/2016 |

* cited by examiner

```
Failure prompt message 12-1

......
............
............

┌─────────────────────────────┐
│ duration-watched:00000      │
└─────────────────────────────┘
                 Played data length 12-11
............
............

............

┌────────┐
<xxxx>   │ paused │ </xxxx>
         └────────┘
......
......    Playback status 12-12
```

Detailed data 15-1 of game object

```
gameId:1868
onlineUsersNun:0
data{23}
    absenceTime:60
    onlineUsersNum:0
    wxAppid:
    orientation:0
    status:1
    platformType:1
    inageRecognitionMode:3
    name:xxx
    gop:10
    resolutions[2]
    encodingMode:2
    AppKey:
    gameTrialDuration:3680
    publishId:2934
    schemaAppid:    Playback
    gameId:1868    address 15-11
    playUrl: rtsp://xxxxx
    packageSource:1
    gameCoverUrl:https:/xxxxx
    PskipEnable:0
    nsdkRealLogin:0
    nsdkVersion:3
    qAppid:valn
{3}
gameId:1693
```

Media object 15-2 in DLNA standard

```
...
<item id="2-1-1" parentID="2-1" restricted="1">
<dc:title>Movie 1</dc:title>
<upnp:class>object.item.videoItem</upnp:class>
<res protocolInfo="http-get:*:video/mpea:*">
http://xxxxx
</res>              Address 15-21
</item>
<item id="2-1-2" parentID="2-1" restricted="1">
<dc:title>Movie 2</dc:title>
...
```

FIG. 15

Detailed data 16-1 of game object

```
0 {3}
   gameId:1868
   onlineUsersNun:0
   data{23}
      absenceTime:60
      onlineUsersNum:0
      wxAppid:
      orientation:0
      status:1
      platformType:1
      inageRecognitionMode:3
      name:xxx
      gop:10
      resolutions[2]
      encodingMode:2
      AppKey:
      gameTrialDuration:3680
      publishId:2934
      schemaAppid:    Playback
      gameId:1868  address 16-11
      playUrl:rtsp:xxxxx
      packageSource:1
      gameCoverUrl:https://xxxxxx
      PskipEnable:0
      nsdkRealLogin:0
      nsdkVersion:3
      qAppid:valn
```

Preset protocol standard 16-2

CLIENT→SERVER

POST /play HTTP/1.1
User-Agent: iTunes/10.6 (Macintosh; Intel Mac os x 10.7.3)
Content-Length: 163
Content-Type: text/parameters
                                   Playback address 16-21
Content-Location: http://xxxxxx
Start-Position: 0.1740

FIG. 16

Control point 1-1
Interface application service 1-11

Media server 1-2
Content directory 1-21
Connection manager 1-22
AV transport 1-23
Game event control service 17-1

Media player 1-3
Program control service 1-31
Connection manager 1-32
AV transport 1-33

FIG. 17

CLOUD GAMING BY STREAMING VIDEO DATA ON PLAYBACK DEVICE

RELATED APPLICATIONS

This application is a continuation of International Application No. PCT/CN2022/137876, filed on Dec. 9, 2022, which claims priority to Chinese Patent Application No. 202210271200.5 with a filing date of Mar. 18, 2022. The disclosures of the prior applications are hereby incorporated by reference in their entirety.

FIELD OF THE TECHNOLOGY

This application relates to cloud computing technology, including a virtual scene loading method, apparatuses, devices, a computer-readable storage medium, and a computer program product.

BACKGROUND OF THE DISCLOSURE

A cloud gaming application runs a game on a cloud device, and transmits pictures and audio of the game to a playback device via a network, so that a playback device with a weak data processing capability, such as a smart television and a projector, can load a virtual scene of the cloud gaming at runtime.

In the related art, it is usually required to first install a cloud gaming client in the playback device; when a player starts any cloud gaming, the cloud device loads the virtual scene of the cloud gaming in the background; and the cloud gaming client controls the playback device to interact with the cloud device to acquire streaming media data of the virtual scene.

However, due to differences in data transfer protocols, hardware configurations, and the like, the types of playback devices that can install the cloud gaming client are limited, so that there are few playback devices that can load virtual scenes, namely, a small range of devices supporting virtual scene loading.

SUMMARY

Embodiments of this application provide a virtual scene loading method, apparatuses, devices, a computer-readable storage medium, and a computer program product, which can expand the range of devices supporting virtual scene loading.

In an embodiment, a virtual scene loading method executed by a control device includes receiving a streaming media playback address of a first protocol returned by a cloud device in response to an address pull request. The method further includes transmitting, in response to a loading trigger operation associated with a virtual scene, a media projection request corresponding to a local media file to a playback device, and transmitting a loading instruction indicating to start loading the virtual scene to the cloud device. The method further includes generating initial file parameters corresponding to the local media file in response to a parameter acquisition request returned by the playback device in response to the media projection request. The method further includes replacing a local file address of a second protocol in the initial file parameters with the streaming media playback address to obtain modified file parameters, the streaming media playback address providing streaming media data of the virtual scene generated by the cloud device in response to the transmitted loading instruction. The method further includes returning the modified file parameters to the playback device, the modified file parameters providing the streaming media playback address to the playback device.

In an embodiment, a virtual scene loading method executed by a playback device includes receiving, from a control device, a media projection request corresponding to a local media file. The method further includes returning a parameter acquisition request to the control device in response to the media projection request, and parsing a streaming media playback address of a first protocol from modified file parameters returned by the control device in response to the parameter acquisition request, the modified file parameters being obtained by replacing a local file address of a second protocol in initial file parameters with the streaming media playback address, and the initial file parameter corresponding to the local media file. The method further includes pulling streaming media data of a virtual scene from the streaming media playback address, and playing the streaming media data.

In an embodiment, a control device apparatus for virtual scene loading includes processing circuitry configured to receive a streaming media playback address of a first protocol returned by a cloud device in response to an address pull request. The processing circuitry is further configured to transmit, in response to a loading trigger operation associated with a virtual scene, a media projection request corresponding to a local media file to a playback device, and transmit a loading instruction indicating to start loading the virtual scene to the cloud device. The processing circuitry is further configured to generate initial file parameters corresponding to the local media file in response to a parameter acquisition request returned by the playback device in response to the media projection request. The processing circuitry is further configured to replace a local file address of a second protocol in the initial file parameters with the streaming media playback address to obtain modified file parameters, the streaming media playback address providing streaming media data of the virtual scene generated by the cloud device in response to the transmitted loading instruction. The processing circuitry is further configured to return the modified file parameters to the playback device, the modified file parameters providing the streaming media playback address to the playback device.

The embodiments of this disclosure have the following beneficial effects: The control device can first pull a streaming media playback address from a cloud device for a virtual scene, and transmit a media projection request for a local media file to a playback device when the virtual scene loading begins, to trigger a projection receiving-processing flow of the playback device, then in response to a parameter acquisition request transmitted by the playback device, modify a local file address in an initial file parameter corresponding to the local media file to a streaming media playback address of a first protocol, and return the obtained target file parameter (modified file parameters) to the playback device. Therefore, the playback device, during playing, pulls the streaming media data of a virtual scene from a streaming media playback address provided by a target file parameter before playing, so that even when a playback device does not support a cloud gaming client, the streaming media data of the virtual scene may be played, the virtual scene loading is realized, and finally the range of devices supporting the virtual scene loading is expanded.

BRIEF DESCRIPTION OF THE DRAWINGS

FIG. 15 is a process diagram of encapsulating a game list into a media object in media content service of DLNA provided by an embodiment of this disclosure.

FIG. 16 is a diagram of replacing a playback address of a preset protocol standard with a streaming media playback address provided by a cloud device provided by an embodiment of this disclosure.

FIG. 17 is a diagram of a DLNA standard to be implemented by a gamepad provided by an embodiment of this disclosure.

DESCRIPTION OF EMBODIMENTS

Figure 1:
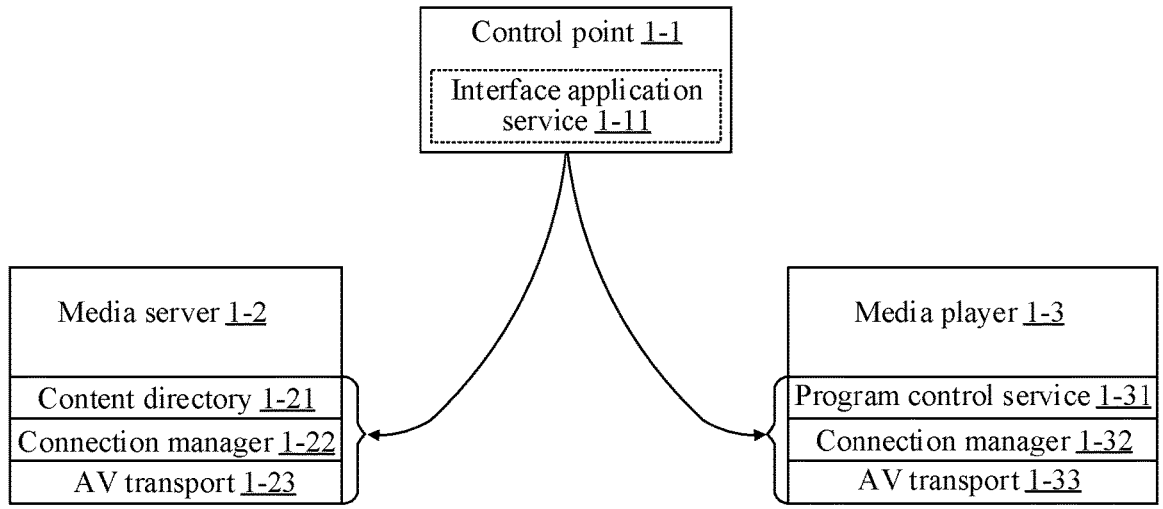
FIG. 1 is a diagram of a DLNA standard that a control device needs to implement.

To make the objectives, technical solutions, and advantages of this disclosure clearer, the following describes this disclosure in further detail with reference to the drawings. The described embodiments are not to be considered as a limitation to this disclosure. All other embodiments obtained by the ordinarily skilled in the art without creative efforts shall fall within the protection scope of this disclosure.

In the following description, the term "some embodiments" describes subsets of all possible embodiments, but it may be understood that "some embodiments" may be the same subset or different subsets of all the possible embodiments, and can be combined with each other without conflict.

Unless otherwise defined, meanings of all technical and scientific terms used in this specification are the same as those usually understood by the skilled in the art to which this disclosure belongs. The terms used herein are for the purpose of describing the embodiments of this disclosure only and are not intended to limit this application.

Before the embodiments of this disclosure are further described in detail, a description is made on nouns and terms in the embodiments of this disclosure, and the nouns and terms in the embodiments of this disclosure are applicable to the following explanations.

(1) Cloud computing refers to the delivery and use mode of IT infrastructure, and refers to obtaining the required resources through the network in an on-demand and scalable manner. Broad cloud computing refers to the delivery and use mode of services, and refers to obtaining the required services through a network in an on-demand and scalable network. Such services may be IT and software, Internet-related, or other services; and cloud computing is the product of the convergence of traditional computer and network technology developments, such as grid computing, distributed computing, parallel computing, utility computing, network storage technologies, virtualization, and load balance.

With the diversification of the Internet, real-time data streams, connecting devices, and the demands of search services, social networks, mobile commerce, and open collaboration, cloud computing has developed rapidly. Unlike the previous parallel distributed computing, the generation of cloud computing will promote the revolution of the whole Internet model and the enterprise management model from the concept.

(2) Cloud gaming, also known as gaming on demand, is a cloud computing-based online gaming technology. Cloud gaming technology enables high-quality games to be run on thin clients with relatively limited graphics processing and data computing capabilities. In a cloud gaming scene, a game is not run in a player's game terminal, but is run in a server (for example, a cloud device), and a virtual scene of the game is rendered by the server as a video audio stream for transmission to the game terminal over a network. The game terminal need not have powerful graphic computing and data processing capabilities, but only have basic streaming media playback capabilities and the ability to obtain player input instructions and transmit them to the server. The playback device in the embodiments of this disclosure may be regarded as a game terminal.

(3) The control device is a device for controlling the starting of the cloud gaming and the running of the cloud gaming, for example, a gamepad and a remote controller.

(4) The universal plug and play (UPnP) protocol is an interconnection protocol between devices, which can provide functions including addressing, mutual device discovery, and the like.

(5) The digital living network alliance (DLNA) standard is a UPnP-based standard for sharing content services with devices. Different devices can access each other's services. It should be noted that DLNA is a solution that contains multiple protocols such as hypertext transfer protocol (HTTP) and hypertext transfer protocol secure (HTTPS).

(6) A media server is used for providing a media content service according to the DLNA standard. The media server may be applied in the storage device to facilitate access to the content of pictures, videos, and the like in the storage device.

The media server is used for implementing the following standard interfaces: a content directory, a connection manager, and an audio/video transport (AV transport).

The content directory is used for providing a query and index service for media content (such as pictures, audio, and video). The connection manager is used for managing the connection between the media server and the media player. The AV transport is used for providing interfaces for media playback address, starting playing, pausing playing, and the like.

(7) A media player provides a display media service according to the DLNA standard. The media player may be applied to a playback device such as a smart television, a projector, and a vehicle terminal, that is, the playback device in the embodiment of this disclosure supports the DLNA standard.

The media player is used for implementing the following standard interfaces: a rendering control, a connection manager, and an AV transport.

The rendering control is used for providing an interface for setting playback attributes (such as luminance, contrast, and volume), and the like. The use of connection managers and AV transport has been described in the media server section.

(8) A control point is a controller implemented according to the DLNA standard for coordinating the media server and the media player to control the display of the content. For example, a mobile terminal may implement a control point standard so that a video application (APP) on the mobile terminal may project the video into a playback device such as a television for playback. The control device in the embodiments of this disclosure may be understood as a control point.

It should be noted that a control point coordinates a media server and a media player by invoking a standard interface implemented by the media server and invoking a standard interface implemented by the media player.

Exemplarily, FIG. 1 is a diagram of a DLNA standard that a control device needs to implement. The control device needs to implement the control point 1-1 and coordinate the work of the media server 1-2 and the media player 1-3 through the control point 1-1. The control point 1-1 includes an interface application service 1-11 for presenting useful information to a user through the interface application service 1-11. The media server 1-2 includes a content directory 1-21, a connection manager 1-22, and an AV transport 1-23; the media player 1-3 includes a program control service 1-31, a connection manager 1-32, and an AV transport 1-33. The control point 1-1 coordinates the work of the media server 1-2 and the media player 1-3, that is, coordinating the work of the content directory 1-21, the connection manager 1-22, the AV transport 1-23, the program control service 1-31, the connection manager 1-32, and the AV transport 1-33.

(9) A real time streaming protocol (RTSP) is a protocol for encoding and transmitting audio and video data in real time.

(10) In response to is used for representing a condition or state upon which the performed operation depends. The performed operation or operations may be in real-time or may have a set delay in response to meeting the dependent condition or state. Without being specifically stated, there is no limitation in the order of the plurality of operations performed.

(11) A virtual scene is a virtual scene displayed (or provided) on a display device. The virtual scene may be a real-world simulation environment, may also be a semi-simulation semi-virtual virtual environment, and may also be a pure-virtual virtual environment; the virtual scene may be any one of a two-dimensional virtual scene, a 2.5-dimensional virtual scene, or a three-dimensional virtual scene. The virtual scene in the embodiment of this disclosure may be a virtual scene in a game application, and may also be a virtual scene in a virtual reality (VR) application.

(12) A virtual object is an image of various people and things that can interact in a virtual scene or a movable object in a virtual scene. The movable object may be a virtual character, a virtual animal, an animated character, and the like, such as a character, an animal, a plant, a wall, and a stone, displayed in the virtual scene. The virtual object may be a virtual avatar in the virtual scene for representing a user.

A plurality of virtual objects may be included in the virtual scene, each virtual object having its own shape and volume in the virtual scene and occupying a part of the space in the virtual scene.

A cloud gaming application runs a game on a server, and transmits pictures and audio of the game to a playback device via a network, so that a playback device with a weak data processing capability, such as a smart television, a projector, and a vehicle terminal can also load a virtual scene of the cloud gaming at runtime.

In the related art, it is usually required to first install a cloud gaming client in a playback device, so that when a player (namely, a user) starts any cloud gaming, the cloud gaming client instructs a server to load a virtual scene of the cloud gaming in the background, and the cloud gaming client controls the playback device to interact with the server to acquire a picture and audio of the virtual scene, and controls the playback device to display the acquired picture and audio.

It should be noted that a cloud gaming client is different from an ordinary game client; the game client can run a corresponding game locally; and the cloud gaming client is equivalent to a game selection platform for a user to select different cloud gaming and for invoking a server to load the cloud gaming selected by the user.

Figure 2:
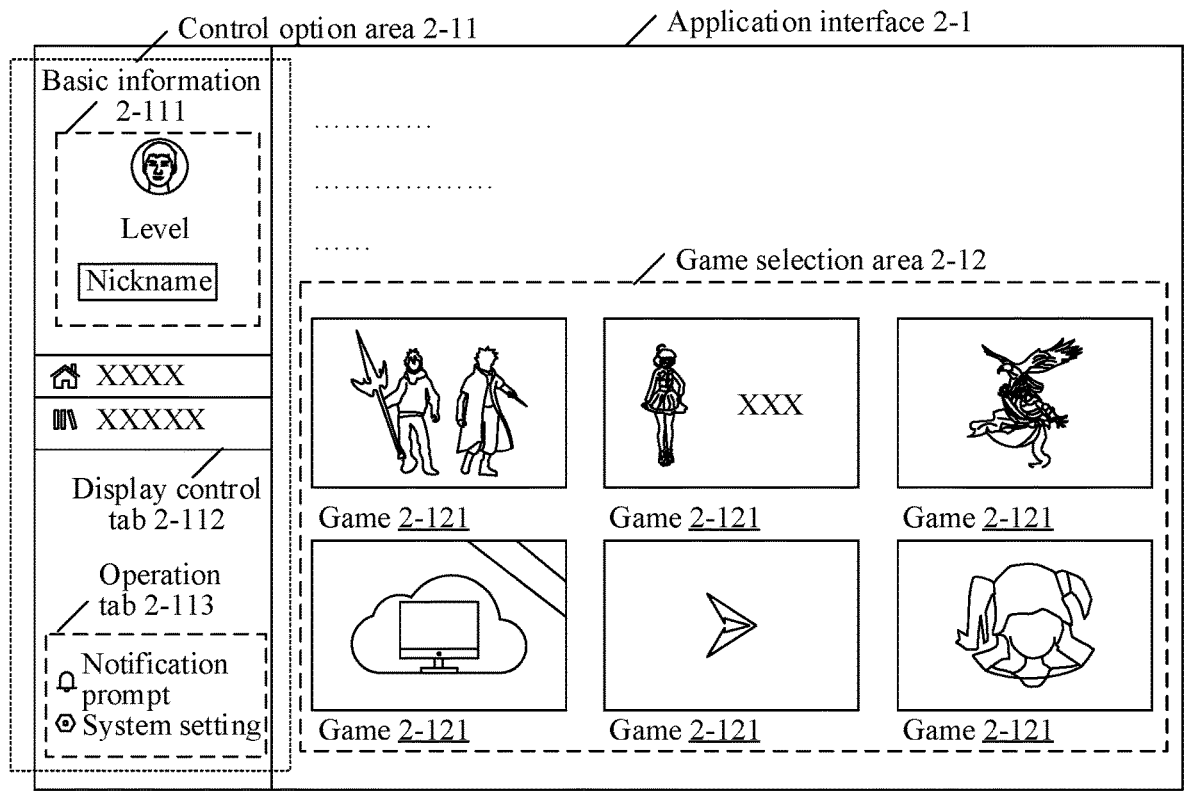
FIG. 2 is a diagram of an interface of a cloud gaming client.

Exemplarily, FIG. 2 is an interface diagram of a cloud gaming client. Referring to FIG. 2, the interface 2-1 of the cloud gaming client includes two areas, a control option area 2-11 and a game selection area 2-12. In the control option area 2-11, there are shown player's basic information 2-111 (for example, the player's nickname and level), a display control tab 2-112, an operation tab 2-113 (for example, system settings, notification prompts and other tabs), and the like. In the game selection area 2-12, there is shown a game 2-121 that the player can select to activate for the player to select the game to be activated.

However, due to differences in data transfer protocols, hardware configurations, and the like, the types of playback devices that can install a cloud gaming client are limited, for example, some brands of smart television cannot install a cloud gaming client, so that there are few playback devices that can load virtual scenes, namely, a small range of devices supporting virtual scene loading.

Embodiments of this disclosure provide a virtual scene loading method, apparatuses, devices, a computer-readable storage medium, and a computer program product, which can expand the range of devices supporting virtual scene loading. The following describes exemplary applications of the control device, the playback device, and the cloud device provided by the embodiments of this disclosure; the playback device provided by the embodiments of this disclosure may be implemented as various types of terminals, such as a laptop, a tablet, a desktop computer, a smart television, and a vehicle terminal; the control device may be implemented as a control handle, a somatosensory device, and the like; and the cloud device may be implemented as a server. In the following, exemplary applications will be described when the control device is implemented as a smart television, the control device as a control handle, and the cloud device as a server.

Figure 3:
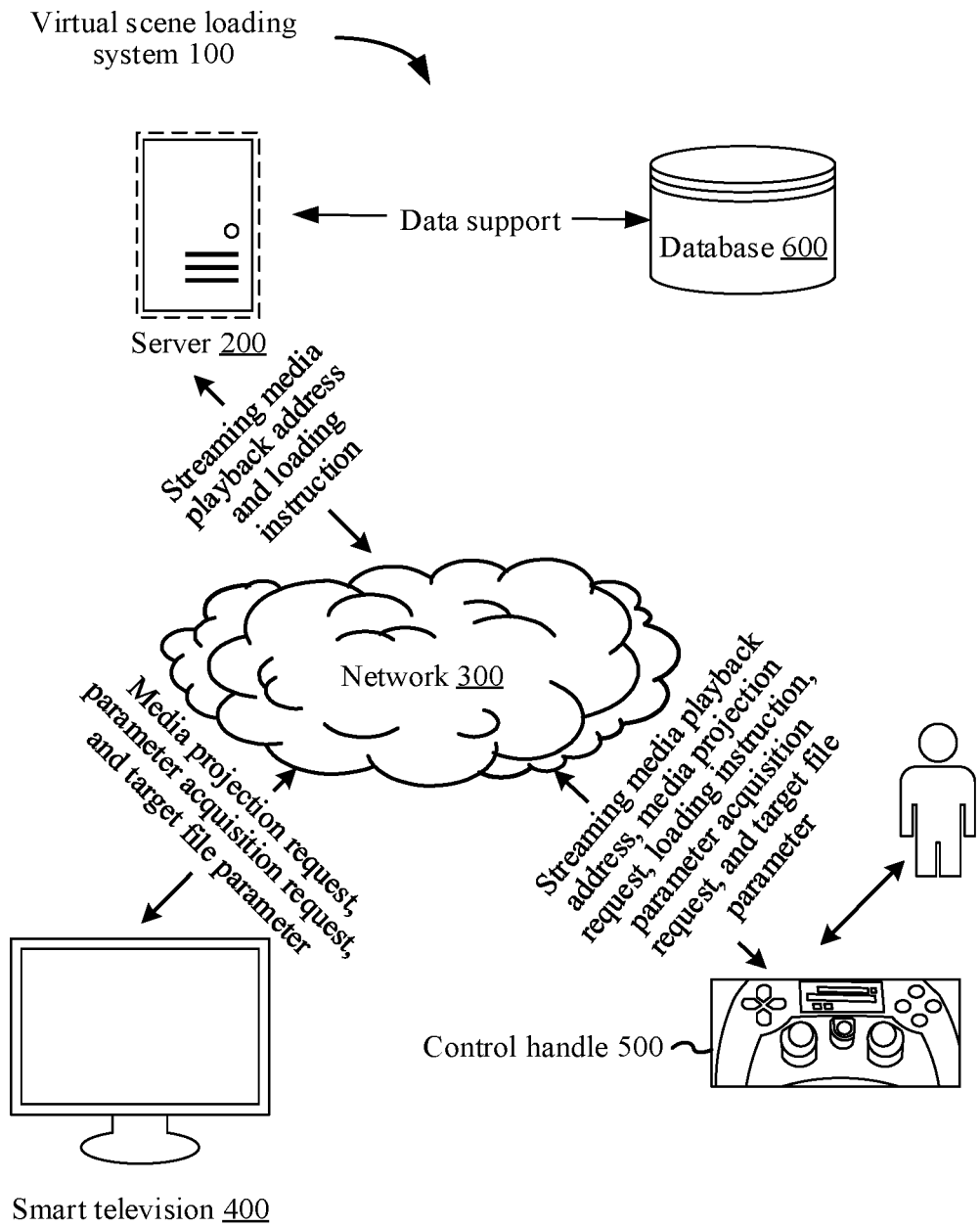
FIG. 3 is an architectural diagram of a virtual scene loading system provided by an embodiment of this disclosure.

Referring to FIG. 3, FIG. 3 is an architectural diagram of a virtual scene loading system provided by an embodiment of this disclosure. To support a virtual scene loading application, in the virtual scene loading system 100, a control handle 500 (control device) and a smart television 400 (playback device) are connected to the server 200 (cloud device) through network 300, the network 300 being a wide area network or a local area network, or a combination of both. In the virtual scene loading system 100, a database 600 is also provided to provide data support to the server 200. The database 600 may be set up in the server 200 or may be independent of the server 200. FIG. 3 shows the case where the database 600 is independent of the server 200.

The control handle 500 is configured to: receive a streaming media playback address of the first protocol returned by the server 200 for the address pull request; transmit, in response to a loading trigger operation for a virtual scene, a media projection request corresponding to a local media file to the smart television 400, and transmit a loading instruction indicating to start loading the virtual scene to the server 200; acquire an initial media parameter corresponding to a local media file in response to a parameter acquisition request returned by the smart television 400 for a media projection request; replace a local file address of a second protocol in the initial file parameter using the streaming media playback address to obtain a target file parameter (modified file parameters); and return the target file parameter to the smart television 400.

The smart television 400 is configured to: receive a media projection request transmitted by the control handle 500 for a local media file; return a parameter acquisition request to the control handle 500 in response to the media projection request; parse a streaming media playback address of a first protocol from a target file parameter returned by the control handle 500 for the parameter acquisition request; and pull streaming media data of the virtual scene from the streaming media playback address, and play the streaming media data.

The server 200 is configured to: generate a streaming media playback address of a first protocol in response to an address pull request transmitted by the control handle 500; return the streaming media playback address to the control handle 500; receive a loading instruction transmitted by the control handle 500 for indicating to start loading a virtual scene; and load, in response to the loading instruction, the virtual scene to obtain streaming media data corresponding to the virtual scene, and store the streaming media data into the streaming media playback address.

In some embodiments, the server 200 may be an independent physical server, and may also be a server cluster or distributed system composed of a plurality of physical servers, and may further be a cloud server providing basic cloud computing services such as cloud services, cloud databases, cloud computing, cloud functions, cloud storage, network services, cloud communications, middleware services, domain name services, security services, CDN, as well as big data and artificial intelligence platforms. The server 200, the smart television 400, and the control handle 500 may be directly or indirectly connected through wired or wireless communication, which are not limited in the embodiments of this disclosure.

Figure 4:
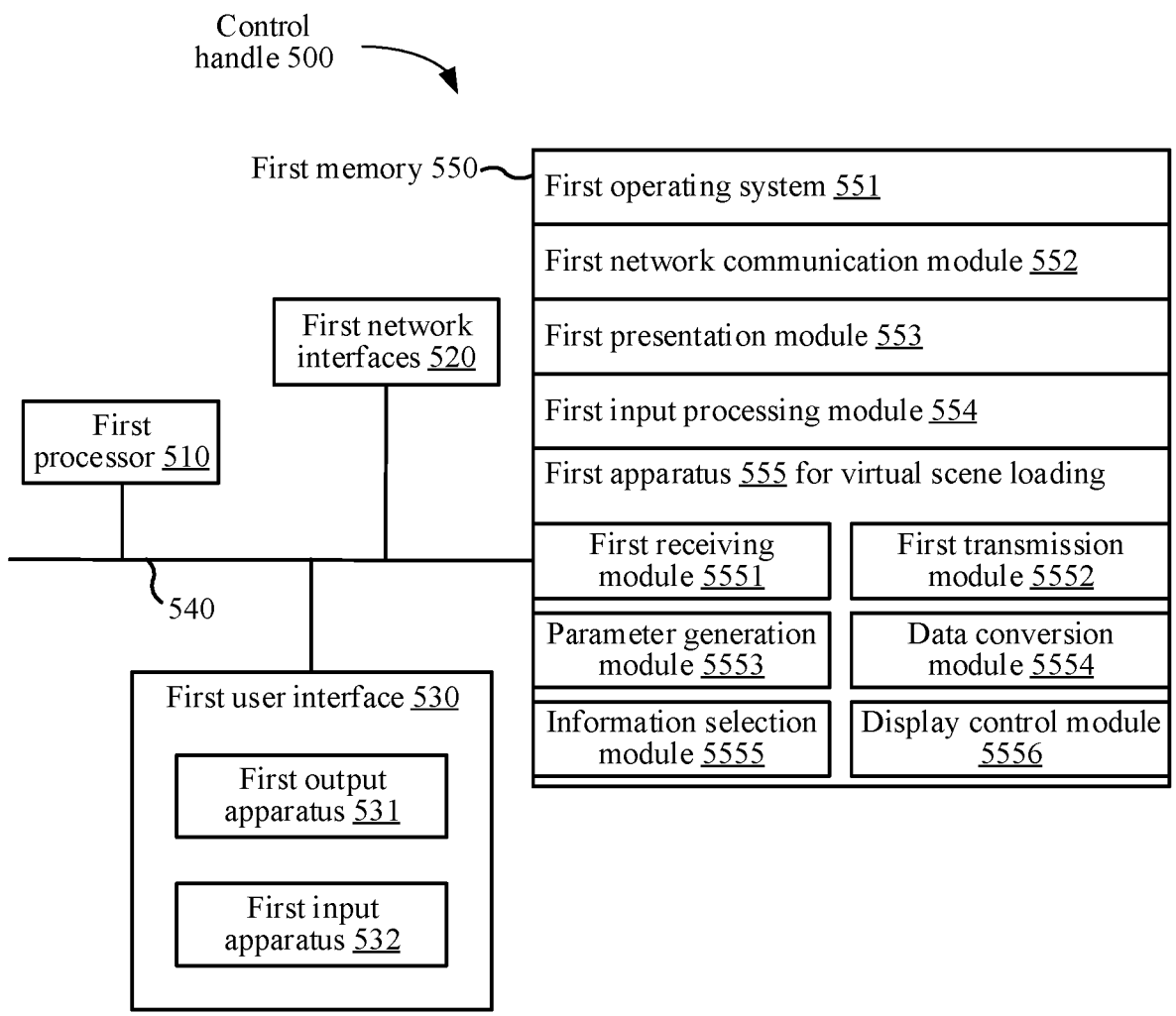
FIG. 4 is a structural diagram of a control handle in FIG. 3 provided by an embodiment of this disclosure.

Referring to FIG. 4, FIG. 4 is a structural diagram of a control handle (an implementation of a control device) in FIG. 3 provided by an embodiment of this disclosure; the control handle 500 shown in FIG. 4 includes at least one first processor 510, a first memory 550, at least one first network interface 520, and a first user interface 530. The various assemblies in the control handle 500 are coupled together by a first bus system 540. It may be understood that the first bus system 540 is configured to implement connection and communication between the assemblies. The first bus system 540 includes a power bus, a control bus, and a status signal bus in addition to a data bus. However, for the sake of clarity, the various buses are labeled as the first bus system 540 in FIG. 4.

The first processor 510 may be an integrated circuit chip with signal processing capabilities, such as a general-purpose processor, a digital signal processor (DSP), or other programmable logic devices, discrete gate or transistor logic devices, and discrete hardware assemblies; the general-purpose processor may be a microprocessor or any processor, and the like.

The first user interface 530 includes one or more first output apparatuses 531 enabling the presentation of media content, including one or more speakers and/or one or more visual display screens. The first user interface 530 further includes one or more first input apparatuses 532, including user interface components that facilitate user input, such as a keyboard, mouse, microphone, touch-screen display screen, camera, other input buttons, and controls.

The first memory 550 may be removable, non-removable, or a combination thereof. Exemplary hardware devices include solid-state memories, hard disk drives, optical disk drives, and the like. The first memory 550 may include one or more storage devices physically located remotely from the first processor 510.

The first memory 550 includes a volatile memory or a non-volatile memory and may include both volatile and non-volatile memories. The non-volatile memory may be a read-only memory (ROM), and the volatile memory may be a random-access memory (RAM). The first memory 550 described in the embodiments of this disclosure is intended to include any suitable type of memory.

In some embodiments, the first memory 550 can store data to support various operations, and the examples of the data include programs, modules, and data structures, or subsets or supersets thereof, as exemplified below.

A first operating system 551 is configured to implement various basic services and processing hardware-based tasks, including system programs for processing various basic system services, and executing hardware-related tasks, such as a framework layer, a core library layer, and a driver layer.

A first network communication module 552 is configured to reach other computing devices via one or more (wired or wireless) first network interfaces 520, an exemplary first network interface 520 including Bluetooth, WiFi, a universal serial bus (USB), and the like.

A first presentation module 553 is configured to enable presentation of information (for example, a user interface for operating peripheral devices and displaying content and information) via one or more first output apparatuses 531 (for example, a display screen and a speaker) associated with the first user interface 530.

A first input processing module 554 is configured to detect one or more user inputs or interactions from one of the one or more first input apparatuses 532 and interpreting the detected inputs or interactions.

In some embodiments, a first apparatus for virtual scene loading provided by an embodiment of this disclosure may be implemented in software. FIG. 4 shows a first apparatus 555 stored in a first memory 550, which may be software in the form of a program, a plug-in, and the like, including the following software modules: a first receiving module 5551, a first transmission module 5552, a parameter generation module 5553, a data conversion module 5554, an information selection module 5555, and a display control module 5556, which are logical and therefore can be arbitrarily combined or further split depending on the function implemented. The functions of the various modules will be described below.

Figure 5:
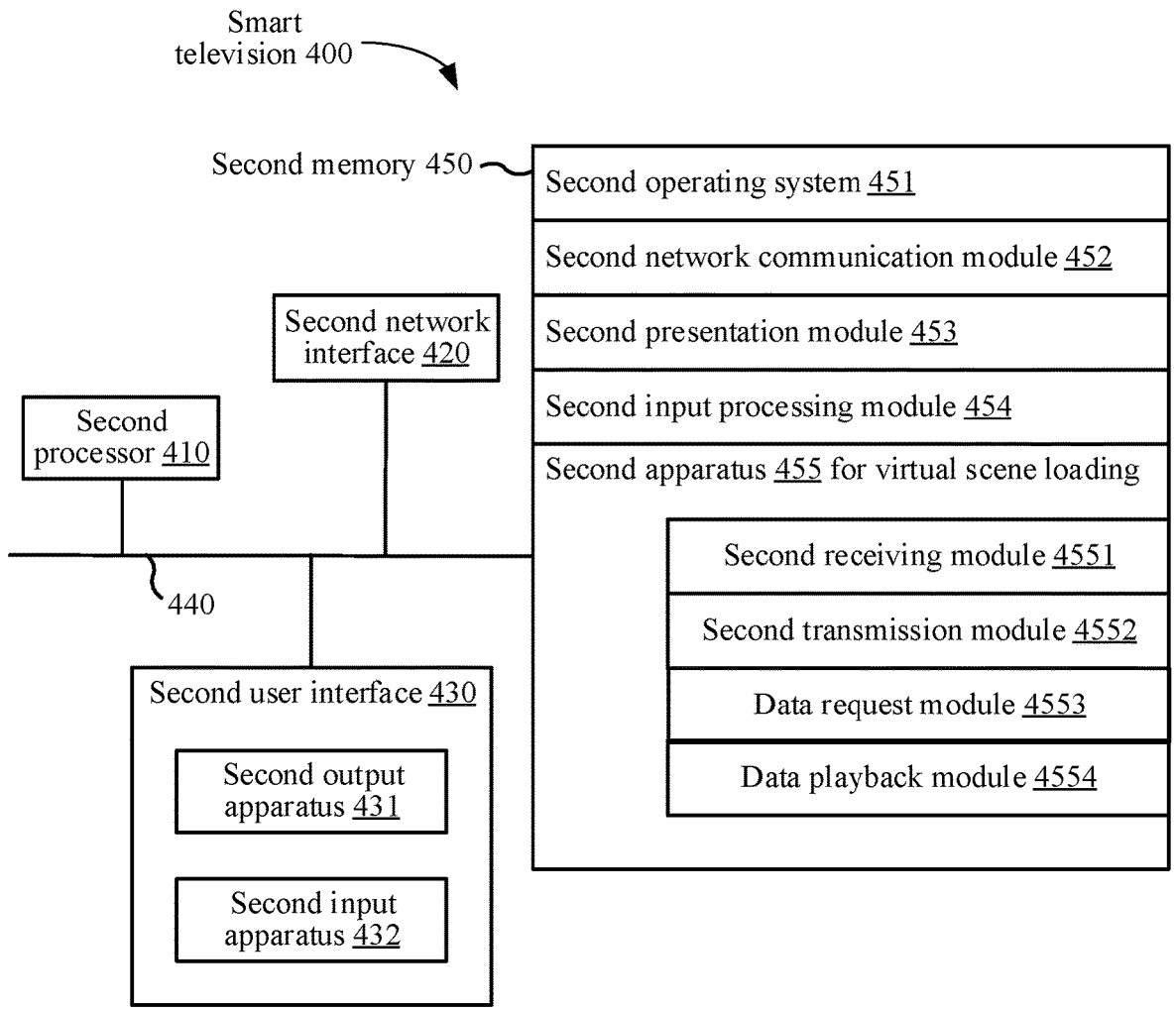
FIG. 5 is a structural diagram of a smart television in FIG. 3 provided by an embodiment of this disclosure.

Referring to FIG. 5, FIG. 5 is a structural diagram of a smart television (an implementation of a playback device) in FIG. 3 provided by an embodiment of this disclosure; the smart television 400 shown in FIG. 5 includes at least one second processor 410, a second memory 450, at least one second network interface 420, and a second user interface 430. The various assemblies in the smart television 400 are coupled together by a second bus system 440. It may be understood that the second bus system 440 is configured to enable connection communication between the assemblies. The second bus system 440 includes a power bus, a control bus, and a status signal bus in addition to a data bus. However, for the sake of clarity, the various buses are labeled as the second bus system 440 in FIG. 5.

The second processor 410 may be an integrated circuit chip with signal processing capabilities, such as a general-purpose processor, a digital signal processor (DSP), or other programmable logic devices, discrete gate or transistor logic devices, and discrete hardware assemblies; the general-purpose processor may be a microprocessor or any processor, and the like.

The implementation of the second user interface 430 is similar to that of the first user interface 530, which will not be repeated.

In some embodiments, the second memory 450 can store data to support various operations, and the examples of the data include programs, modules, and data structures, or subsets or superset thereof, as exemplified below.

The implementations of the second operating system 451, the second network communication module 452, the second presentation module 453, and the second input processing module 454 are similar to that of the first operating system 551, the first network communication module 552, the first presentation module 553, and the first input processing module 554, respectively, and the description thereof will not be repeated.

In some embodiments, a second apparatus for virtual scene loading provided by an embodiment of this disclosure may be implemented in software. FIG. 5 shows a second apparatus 455 stored in a second memory 450, which may be software in the form of a program, a plug-in, and the like, including the following software modules a second receiving module 4551, a second transmission module 4552, a data request module 4553, and a data playback module 4554, which are logical and therefore can be arbitrarily combined or further split depending on the function implemented. The functions of the various modules will be described below.

Figure 6:
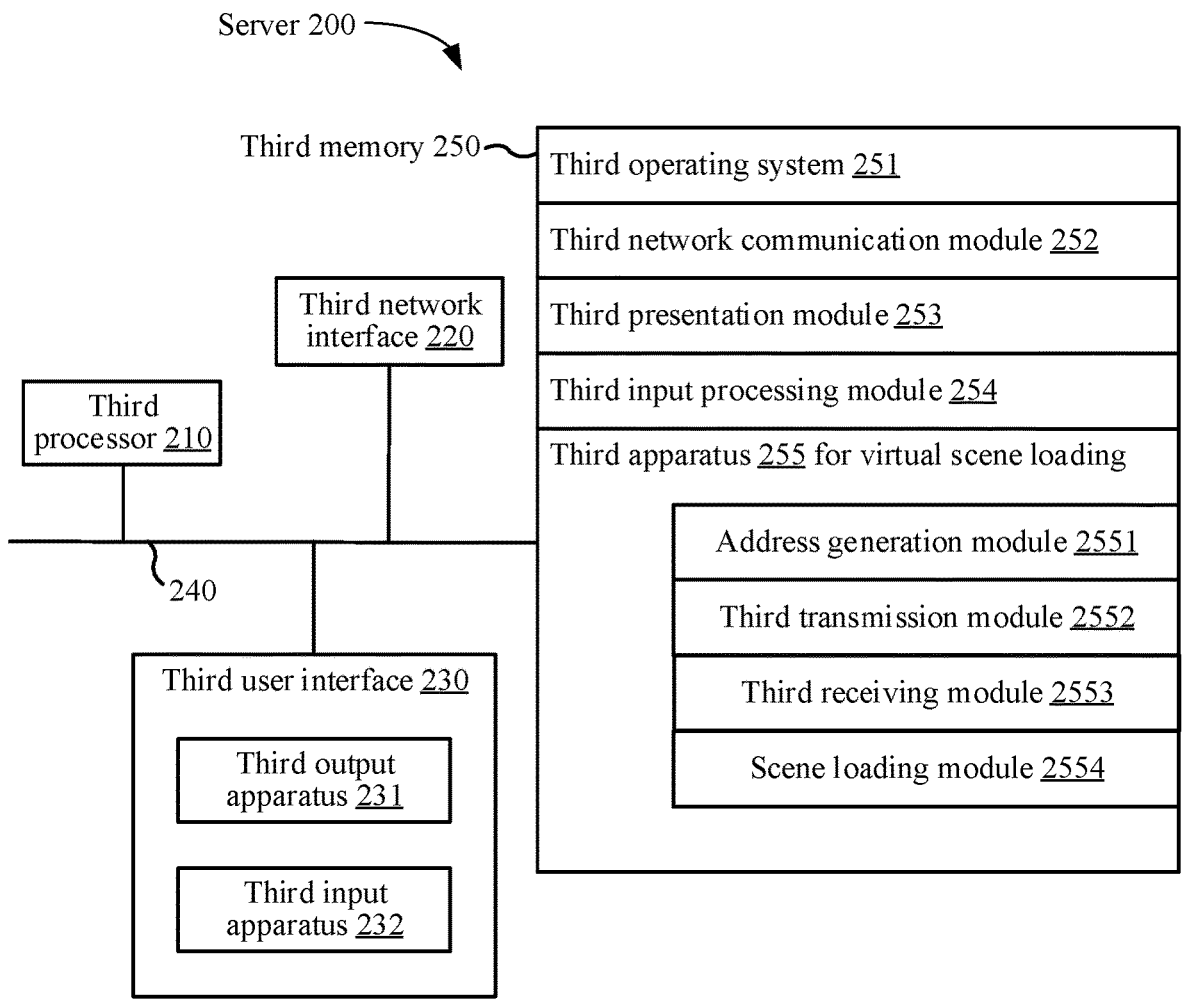
FIG. 6 is a structural diagram of a server in FIG. 3 provided by an embodiment of this disclosure.

Referring to FIG. 6, FIG. 6 is a structural diagram of a server (an implementation of a cloud device) in FIG. 3 provided by an embodiment of this disclosure; the server 200 shown in FIG. 6 includes at least one third processor 210, a third memory 250, at least one third network interface 220, and a third user interface 230. The various assemblies in the server 200 are coupled together using a third bus system 240. It may be understood that, the third bus system 240 is configured to implement connection and communication between the assemblies. The third bus system 240 includes a power bus, a control bus, and a status signal bus in addition to a data bus. However, for the sake of clarity, the various buses are labeled as the third bus system 240 in FIG. 6.

The third processor 210 may be an integrated circuit chip with signal processing capabilities, such as a general-purpose processor, a digital signal processor (DSP), or other programmable logic devices, discrete gate or transistor logic devices, and discrete hardware assemblies; the general-purpose processor may be a microprocessor or any processor, and the like.

The implementation of the third user interface 230 is similar to that of the first user interface 530, and the description thereof will not be repeated.

In some embodiments, the third memory 250 can store data to support various operations, and the examples of the data include programs, modules, and data structures, or subsets or supersets thereof, as exemplified below.

The implementations of the third operating system 251, the third network communication module 252, the third presentation module 253, and the third input processing module 254 are similar to that of the first operating system 551, the first network communication module 552, the first presentation module 553, and the first input processing module 554, respectively, and the description thereof will not be repeated.

In some embodiments, a third apparatus for virtual scene loading provided by an embodiment of this disclosure may be implemented in software. FIG. 6 shows a third apparatus 255 stored in a third memory 250, which may be software in the form of a program, a plug-in, and the like, including the following software modules: an address generation module 2551, a third transmission module 2552, a third receiving module 2553, and a scene loading module 2554, which are logical and therefore can be arbitrarily combined or further split depending on the function implemented. The functions of the various modules will be described below.

In some embodiments, a control handle (a control device), a smart television (a playback device), and a server (a cloud device) may implement the virtual scene loading method provided by an embodiment of this disclosure by running a computer program. For example, the computer program may be a native program or a software module in an operating system. It may be a local APP, namely, a program that needs to be installed in the operating system to run, such as a cloud gaming connection assistant APP. It may be an applet, namely, a program that only needs to be downloaded to the browser environment to run. It may also be an applet that may be embedded in any APP. In general, the above computer programs may be any form of APP, module, or plug-in.

The embodiments of this disclosure may be applied to scenes loaded by various virtual scenes, such as cloud technology, artificial intelligence, intelligent traffic, and vehicles. Hereinafter, a virtual scene loading method provided by an embodiment of this disclosure will be described in conjunction with exemplary applications and implementations of a control device, a playback device, and a cloud device provided by the embodiment of this disclosure.

Figure 7:
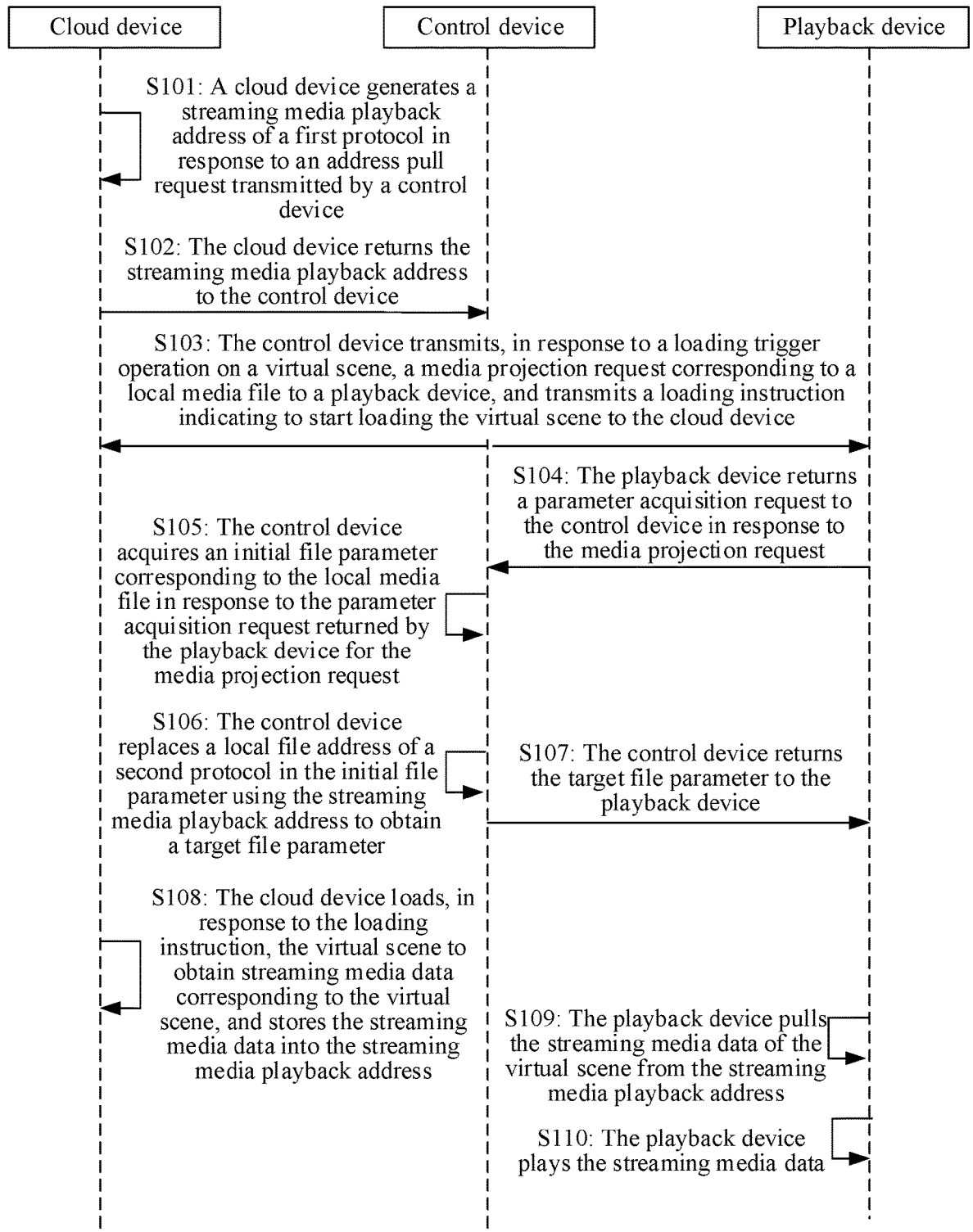
FIG. 7 is a flow diagram of a virtual scene loading method provided by an embodiment of this disclosure.

Referring to FIG. 7, FIG. 7 is a flow diagram of a virtual scene loading method provided by an embodiment of this disclosure, which will be illustrated in combination with the steps shown in FIG. 7.

S101: A cloud device generates a streaming media playback address of a first protocol in response to an address pull request transmitted by a control device.

The embodiment of this disclosure is realized under a scene of loading a virtual scene, for example, loading a virtual scene corresponding to cloud gaming, to enable a user to perform an interactive experience with the virtual scene. When starting to load a virtual scene, a control device first pulls a playback address of the streaming media data corresponding to the virtual scene from a cloud device, and then provides the playback address to a playback device, so that the playback device acquires the streaming media data from the playback address before playing. Therefore, in the embodiment of this disclosure, a control device needs to generate an address pull request for a virtual scene and transmit the address pull request to a cloud device via a network. After receiving the address pull request, the cloud device generates a streaming media playback address for providing streaming media data generated when loading the virtual scene based on the first protocol. That is, in an embodiment of this disclosure, an address pull request is used for pulling a playback address of streaming media data providing a virtual scene.

It should be noted that the first protocol may be a RTSP or a real time messaging protocol (RTMP). Accordingly, the form of a streaming media playback address may be rtsp://xxxxxx or rtmp://xxxxx.

It will be appreciated that the streaming media data may include a video picture of a virtual scene, for example, a change in the appearance of a surrounding scene when a virtual object walks, and may also include an audio of the virtual scene, such as a running water sound effect in the virtual scene.

It is also understood that the virtual scene may be a virtual scene in a cloud gaming application or a virtual scene in a VR application, and the embodiments of this disclosure are not limited herein. The address pull request carries an identification of an application to which a virtual scene belongs; a cloud device parses the identification from the address pull request and determines a virtual scene needing to generate a corresponding streaming media playback address according to the identification.

In an embodiment of this disclosure, a wireless connection module, such as a Wi-Fi module, may be provided in a control device, so that the control device may access a network via the wireless connection module to communicate with a cloud device.

S102: A cloud device returns the streaming media playback address to the control device. For example, a streaming media playback address of a cloud streaming service returned by a cloud device in response to an address pull request is received by a control device.

After the cloud device generates the streaming media playback address, the streaming media playback address is transmitted to the control device via the network to complete the response to the address pull request. The control device receives the streaming media playback address of the first protocol returned by the cloud device for the address pull request, that is, the streaming media playback address is returned by the cloud device for the transmitted address pull request.

It should be noted that S101 and S102 may be executed before the loading trigger operation of the virtual scene is received, that is, the control device first obtains the streaming media playback address from the cloud device, and then uses the same directly when the loading trigger operation of the virtual scene is received; at this time, the address pull request in S101 may be generated and transmitted by the control device in response to the adding operation of the user, and the adding operation refers to the operation of adding the application corresponding to the virtual scene to the application library corresponding to the user, for example, when the user adds a certain game to "my game", an address pull request is generated and transmitted to the cloud device. S101 and S102 may also be executed in response to a loading trigger operation on a virtual scene, that is, when receiving a loading trigger operation by a user for a virtual scene, a control device synchronously pulls a streaming media playback address from a cloud device and transmits a loading instruction, which are not specifically defined herein. In the embodiments of this disclosure, taking the process of performing S101 to S102 first and then starting to respond to a loading trigger operation for a virtual scene as an example, the virtual scene loading method of the embodiments of this disclosure is described.

S103: The control device transmits, in response to a loading trigger operation on the virtual scene, a media projection request corresponding to a local media file to a playback device, and transmits a loading instruction indicating to start loading the virtual scene to the cloud device. For example, in response to a loading trigger operation associated with a virtual scene, a media projection request corresponding to a local media file stored on the control device is transmitted by the control device to a playback device, and a loading instruction indicating to start loading the virtual scene is transmitted by the control device to the cloud device. Additionally, for example, a media projection request corresponding to a local media file stored on the control device is received from the control device by the playback device.

A control device detects in real time whether a user performs a loading trigger operation for a virtual scene; and when the loading trigger operation is detected, performs file scanning locally to obtain a local media file, and generates a media projection request for the local media file and transmits same to a playback device to call the playback device to project via the media projection request. A playback device receives a media projection request transmitted by a control device for a local media file. At the same time, the control device also generates a loading instruction for indicating the cloud device to start loading the virtual scene and transmits the loading instruction to the cloud device via the network. The cloud is configured to receive a loading instruction transmitted by the control device for indicating to start loading the virtual scene.

It will be appreciated that the detection of a loading trigger operation may be accomplished through whether a physical button on the control device is operated by the user, for example, when the user presses a start key on the control handle (an implementation of the control device), the control handle determines that a loading trigger operation has been detected. The detection of the loading trigger operation may also be accomplished through whether the control device is moved, for example, when the user swings the somatosensory device (another implementation of the control device) up to an angle threshold, the somatosensory device determines that the loading trigger operation is detected. The embodiments of this disclosure are not specifically defined herein.

The local media file may be a historical media file stored in the control device, for example, when the cloud device receives a stop instruction of the control device for the virtual scene (used for indicating the cloud device to stop loading the virtual scene) within the historical time, the streaming media data of the virtual scene 1 second before the stop instruction is received is stored to obtain the historical media file and is transmitted to the control device for storage. The local media file may also be a default factory media file, for example, a usage instruction video included in the factory setting information of the control device. Of course, local media files may also be obtained in other ways, and embodiments of this disclosure are not limited herein.

S104: The playback device returns a parameter acquisition request to the control device in response to the media projection request. For example, a parameter acquisition request is returned by the playback device to the control device in response to the media projection request.

After receiving a media projection request, a playback device determines that a user starts loading a virtual scene on a cloud device via a control device, and needs to present streaming media data of the virtual scene to the user via the playback device. At this time, in order to continue to realize projection, the playback device would generate a parameter acquisition request and transmit the parameter acquisition request to the control device, to acquire the specific parameters of the media file needing to be played from the control device via the parameter acquisition request. A control device receives a parameter acquisition request returned by a playback device for a media projection request.

It should be noted that in the embodiments of this disclosure, a local media file is used for triggering a playback device to transmit a parameter acquisition request, namely, for triggering a projection receiving-processing flow of the playback device, rather than needing the playback device to play the local media file. The media file required to be played by the control device is transmitted to the playback device in response to the parameter acquisition request.

S105: The control device acquires an initial file parameter corresponding to the local media file in response to a parameter acquisition request returned by the playback device for the media projection request. For example, initial file parameters corresponding to the local media file are generated by the control device in response to a parameter acquisition request returned by the playback device in response to the media projection request.

The control device performs parameter acquisition on the local media file in response to the parameter acquisition request, and the obtained parameter is an initial file parameter. It will be appreciated that in the initial file parameters, at least a playback address corresponding to the local media file is included, the playback address being generated by the control device.

In some embodiments, the initial file parameter may further include a file size corresponding to the local media file, and information such as a generation time and an encoding type corresponding to the local media file, and the embodiments of this disclosure are not particularly limited herein.

S106: The control device replaces a local file address of a second protocol in the initial file parameter using the streaming media playback address to obtain a target file parameter. For example, a file address of the local media file in the initial file parameters is replaced by the control device with the streaming media playback address to obtain modified file parameters. The streaming media playback address provides streaming media data of the virtual scene generated by the cloud device in response to the transmitted loading instruction.

After obtaining the initial file parameter, the control device will first locate the local file address from the initial file parameter, and then overwrite the local file address with the streaming media playback address, to replace the local file address of the second protocol with the streaming media playback address of the first protocol. The file parameters after completing the address replacement are the target file parameters that need to be transmitted to the playback device.

That is, in the embodiment of this disclosure, the control device uses the initial file parameter corresponding to the local media file as a template, additionally generates a new target file parameter, and provides the playback address of the streaming media file which really needs the playback device to perform projection playback to the playback device in the target file parameter. Accordingly, the target file parameter is used for providing a streaming media playback address to the playback device, and the streaming media playback address is used for providing streaming media data of the virtual scene generated by the cloud device when responding to the loading instruction.

It should be noted that the local file address in the initial file parameter is used for realizing the projection of the local media file, to replace the local file address with the streaming media playback address; in fact, it may be understood that the streaming media data corresponding to the virtual scene is presented on the playback device in the manner of video projection; in this way, there is no need for the participation of the virtual scene cloud gaming client, and the virtual scene loading may be realized even when the playback device does not support the cloud gaming client.

In other embodiments, in addition to modifying the local file address in the initial file parameter, the control device may also modify the original size of the local media file in the initial file parameter, for example, when the size of the streaming media data stored in the streaming media playback address is unknown, the media size may be modified to infinity (the maximum of 64 digits may be regarded as infinity).

It should be noted that the second protocol is a different protocol from the first protocol. The first protocol is a protocol capable of supporting real-time transmission of streaming media data, for example, various streaming media protocols such as RTSP, to ensure that a playback device can play streaming media data of a virtual scene in real time; while the second protocol is a protocol in which streaming media data is processed as a file and cannot support real-time transmission, for example, a HTTP.

Figure 8:
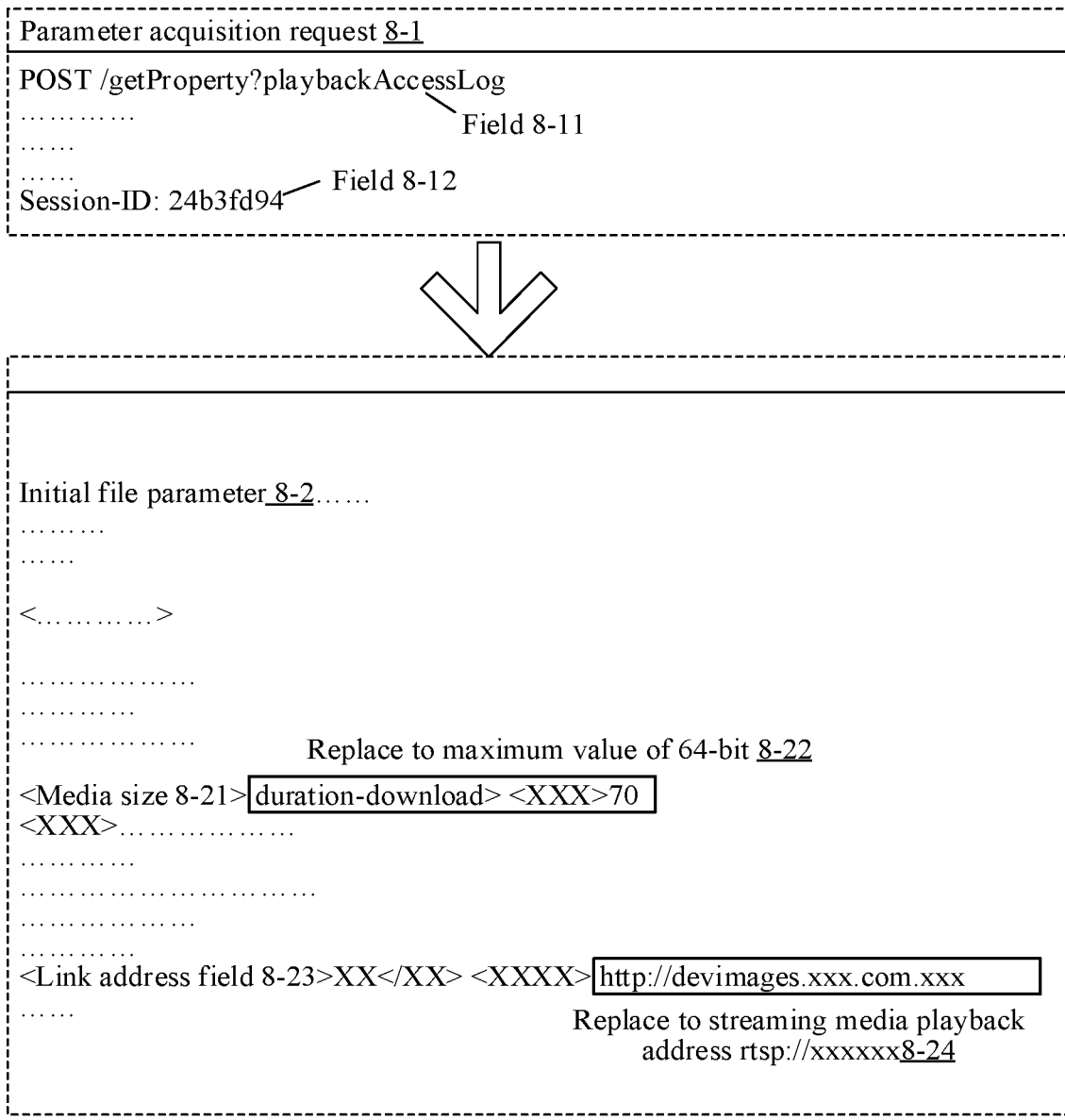
FIG. 8 is a generation diagram of a target file parameter provided by an embodiment of this disclosure.

Exemplarily, FIG. 8 is a generation diagram of a target file parameter provided by an embodiment of this disclosure. The playback device transmits a parameter acquisition request 8-1 to the control device. In the parameter acquisition request 8-1, there is contained a field 8-11 with the content of POST/getProperty?playbackAccessLog to indicate that the parameter acquisition request 8-1 is a specific parameter for acquiring a media file needing to be projected, and a field 8-12 with the content of Session-ID:24b3fd94 to indicate the identity of the playback device to the control device. After receiving the parameter acquisition request 8-1, the control device will firstly acquire the initial file parameter 8-2, and replace the content corresponding to the media size 8-21 in the initial file parameter 8-2, namely, the content corresponding to the field duration-downloaded, from 70 to the maximum value of 64-bit 8-22, and at the same time replace the content of the link address field 8-23, namely, the local file address, from http://devimages.xxx-.com.xxx, replaced to streaming media playback address rtsp://xxxxxx 8-24. After all the replacement work is completed, the control device gets the target file parameters.

S107: The control device returns the target file parameter to the playback device. For example, the modified file parameters are returned by the control device to the playback device. The modified file parameters provide the streaming media playback address to the playback device instead of the initial file parameters corresponding to the local media file to enable the playback device to execute the media projection request by pulling streaming media data of the virtual scene from the streaming media playback address.

The playback device receives the target file parameter returned by the control device for the parameter acquisition request, and parses the streaming media playback address of the first protocol from the target file parameter returned by the control device for the parameter acquisition request so that the subsequent playback device pulls the streaming media data of the virtual scene from the streaming media playback address and plays same. For example, a streaming media playback address of a cloud streaming service is parsed by the playback device. The playback address is parsed from modified file parameters returned by the control device in response to the parameter acquisition request. The modified file parameters are obtained by replacing a file address of the local media file in initial file parameters with the streaming media playback address.

S108: The cloud device loads, in response to the loading instruction, the virtual scene to obtain streaming media data corresponding to the virtual scene, and stores the streaming media data into the streaming media playback address.

After receiving the loading instruction, the cloud device will start to execute the loading process of the virtual scene, and generate streaming media data of the virtual scene when loading, for example, video and audio of the virtual scene when loading, and then directly store the obtained video and audio into the previously created streaming media playback address, or respectively encode and compress the audio and video to obtain a video code stream and an audio code stream and store the video code stream and the audio code stream into the streaming media playback address.

It should be noted that S108 and S104 to S107 may be executed in an order other than the order given by the embodiments of this disclosure, that is, in some embodiments, S104 to S107 may be executed before S108, and S104 to S107 may also be executed in synchronization with S108.

S109: The playback device pulls streaming media data of the virtual scene from the streaming media playback address. For example, streaming media data of a virtual scene is pulled by the playback device from the streaming media playback address, and the streaming media data is played by the playback device.

The playback device accesses a streaming media playback address, and pulls streaming media data stored in the streaming media playback address. In more detail, the playback device first acquires encoding information about streaming media data, namely, encoding information about audio and video from a streaming media playback address, for example, information such as a compression specification, a code rate, a video resolution, an audio sampling rate, the number of compression channels, and the number of compression bits, then establishes an audio channel to receive an audio frame, establishes a video channel to receive a video frame, to receive the audio and video frame by frame to obtain streaming media data of a virtual scene.

Figure 9:
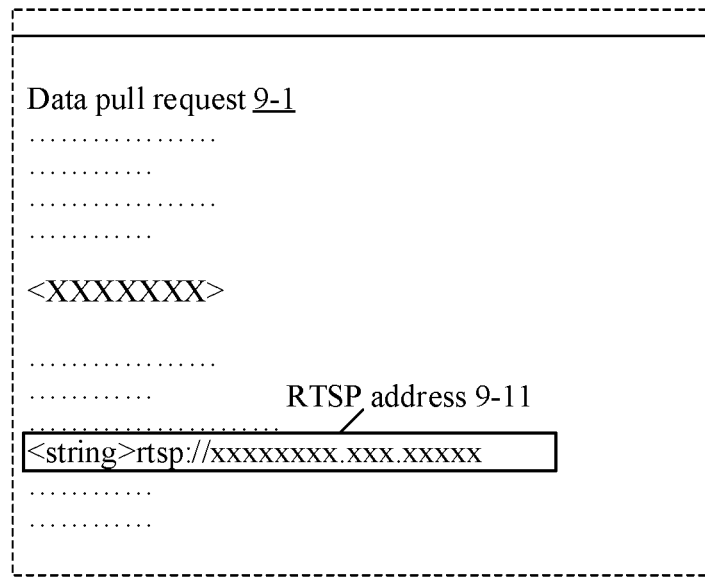
FIG. 9 is a diagram of a playback device pulling streaming media data provided by an embodiment of this disclosure.
Figure 10:
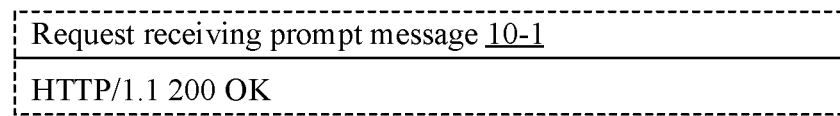
FIG. 10 is a diagram of a request to receive a prompt message provided by an embodiment of this disclosure.

Exemplarily, FIG. 9 is a diagram of a playback device pulling streaming media data provided by an embodiment of this disclosure. The playback device generates a data pull request 9-1 and transmits the data pull request 9-1 to a data server providing streaming media data. The data server first transmits a request receiving prompt message to the playback device to indicate to the playback device that a data pull request 9-1 is received, and then acquires streaming media data according to the RTSP address 9-11 (streaming media playback address) in the data pull request 9-1. FIG. 10 is a diagram of a request to receive a prompt message provided by an embodiment of this disclosure. It may be seen that the request receiving prompt message 10-1 may be a field HTTP/1.1 200 OK.

S110: The playback device plays the streaming media data.

Finally, the playback device displays the video in the requested streaming media data on its own display interface, and at the same time calls an audio output device, such as a loudspeaker box and an earphone to play the audio in the streaming media data. In this manner, the process of virtual scene loading is completed for the user to interact with the virtual scene.

It may be understood that compared with the related art, there are fewer types of playback devices that can install a cloud gaming client so the range of devices supporting loading a virtual scene is small. In an embodiment of this disclosure, the control device can first pull a streaming media playback address from a cloud device for a virtual scene, and transmit a media projection request for a local media file to a playback device when the virtual scene loading begins, to trigger a projection receiving-processing flow of the playback device, then in response to a parameter acquisition request transmitted by the playback device, modify a local file address in an initial file parameter corresponding to the local media file to a streaming media playback address of a first protocol, and return the target file parameter to the playback device. Therefore, the playback device, during playing, pulls the streaming media data of a virtual scene from a streaming media playback address provided by a target file parameter before playing, so that even when a playback device does not support a cloud gaming client, the streaming media data of the virtual scene may be played, the virtual scene loading is realized, and finally the range of devices supporting the virtual scene loading is expanded.

In some embodiments of this disclosure, the control device replaces the local file address of the second protocol in the initial file parameter using the streaming media playback address, and before obtaining the target file parameter, namely before S106, the method may further include the following processing: The control device locates a link address field from an initial file parameter. The control device locates the local file address of the second protocol from the original content corresponding to the link address field in the initial file parameter according to the protocol key word of the second protocol.

The control device reads each field in the initial file parameter until the link address field is read and determines the position of the link address field in the initial file parameter, to complete the location of the link address field. Next, the control device reads the original content of the link address field and then matches the original content of the link address field using the protocol key word of the second protocol, such as http and https to locate the protocol key word from the original content, and then acquires the content after the protocol key word, and concatenates the local file address using the protocol key word and the content after the protocol key word. The local file address is a playback address corresponding to the local media file, namely, if the playback device accesses the local file address, streaming media data of the local media file may be obtained.

It will be appreciated that the link address field may be represented by uri or may be represented by a numerical identification assigned to the link address field, and embodiments of this disclosure are not specifically limited herein.

Exemplarily, when the link address field is uri, the control device finds the uri from the initial file parameters and obtains the original content corresponding to the uri, for example, <string>http://devimages.xx.com, then locates the http in the original content, and takes the http with the content after the http, that is, the complete http://devimages.xx.com as a local file address (that is, the type character <string> of the http://devimages.xx.com is discarded).

The control device overwrites the local file address in the original content using the streaming media playback address to obtain updated content of the link address field, and after the overwriting operation is completed, a completely new file parameter may be obtained, the file parameter being a target file parameter.

In an embodiment of this disclosure, a control device can first locate a local file address from an initial file parameter to replace the local file address with a streaming media playback address to regenerate a completely new target file parameter, thereby realizing fast generation of the target file parameter only through minor changes to the initial file parameter, so that the streaming media playback address may be provided to a playback device without modifying a protocol standard supported by the playback device even if the playback device does not support a cloud gaming client.

In some embodiments of this disclosure, a control device replaces a local file address of a second protocol in an initial file parameter using a streaming media playback address to obtain a target file parameter, which may be achieved by the following processing: The control device deletes the local file address from the original content corresponding to the link address field in the initial file parameter to obtain remaining content corresponding to the link address field. The control device inserts the streaming media playback address into the remaining content according to location information about the local file address in the original content to obtain the latest content corresponding to the link address field. The control device obtains the target file parameter by integrating the link address field, the latest content, other fields in the initial file parameter, and field content corresponding to the other fields.

That is, the control device will take the original content deleting the local file address as the remaining content corresponding to the link address field. Then, the control device uses the location information about the local file address in the original content, for example, the character at the beginning of the local file address, or the number of lines at the beginning of the local file address, to re-insert the streaming media playback address into the position corresponding to the local file address, thus obtaining the latest content corresponding to the link address field. Finally, the control device re-establishes a corresponding relationship between the link address field and the latest content, integrates the link address field and the latest content with fields other than the link address field in the initial file parameter and field contents corresponding to the other fields, and re-forms the file parameter, and the obtained file parameter is the target file parameter.

In the embodiment of this disclosure, by deleting the local file address first and then inserting the streaming media playback address into the original position of the local file address, the control device can simply and quickly realize the generation of the target file parameters and reduce the computational resources required when generating the target file parameters.

Figure 11:
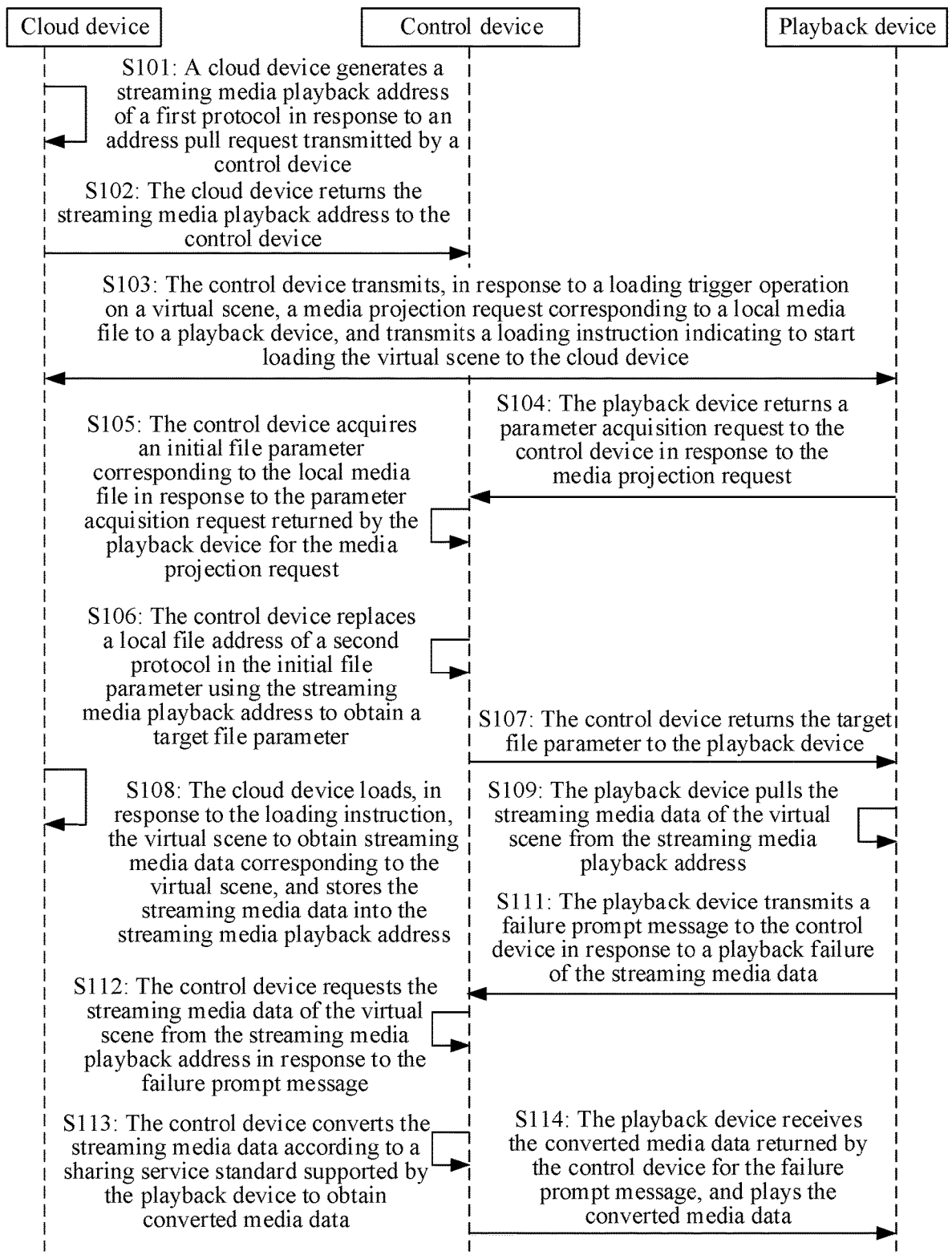
FIG. 11 is another flow diagram of a virtual scene loading method provided by an embodiment of this disclosure.

Based on FIG. 7 and referring to FIG. 11, FIG. 11 is another flow diagram of a virtual scene loading method provided by an embodiment of this disclosure. In some embodiments of this disclosure, after the playback device acquires the streaming media data of a virtual scene pulled from a streaming media playback address, namely after S109, the method may further include:

S111: The playback device transmits a failure prompt message to the control device in response to a playback failure of the streaming media data.

The streaming media data pulled from a streaming media playback address by a playback device may not be successfully played by the playback device due to reasons such as not meeting the protocol service standard of the playback device itself. At this time, the playback device may transmit a failure prompt message to the control device, and the failure prompt message is used for prompting the playback failure of the streaming media data to the control device. The control device receives a failure prompt message returned by the playback device.

In some embodiments, the playback device may autonomously trigger the detection of the playback status of the streaming media data to determine whether the streaming media data is successfully played. In other embodiments, the playback device may also trigger the detection of the playback status of the streaming media data when receiving the playback status callback request transmitted by the control device, and at this moment, the playback device replies a failure prompt message to the control device for the playback status callback request.

Figures 12, 13:
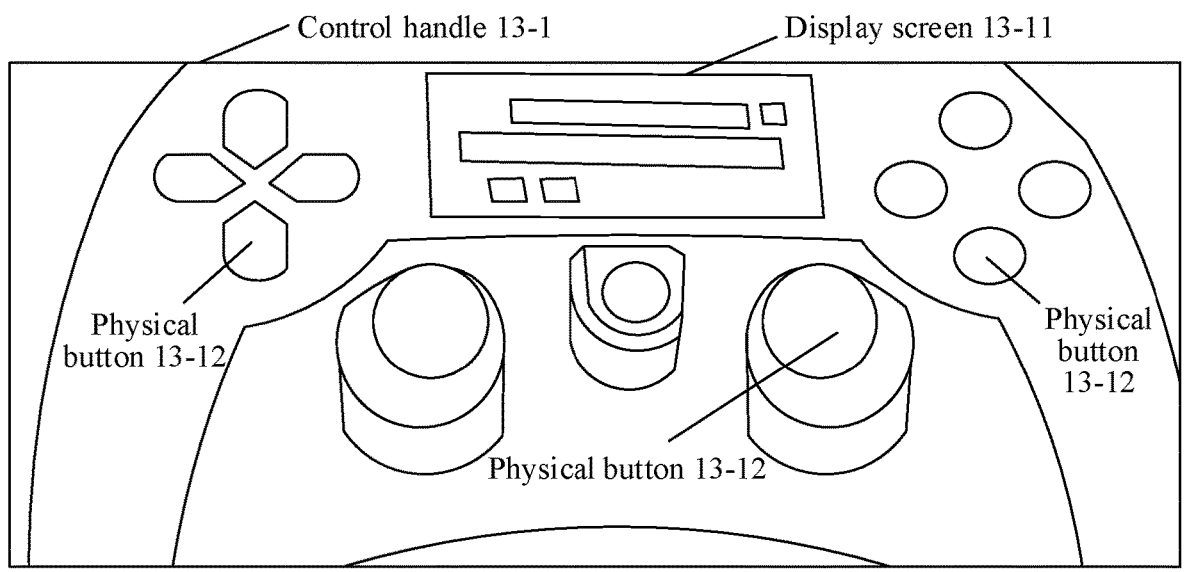
FIG. 12 is a diagram of a failure prompt message provided by an embodiment of this disclosure.
FIG. 13 is an appearance diagram of a control handle provided by an embodiment of this disclosure.

Exemplarily, FIG. 12 is a diagram of a failure prompt message provided by an embodiment of this disclosure. In the failure prompt message 12-1, a played data length 12-11 of the playback device, that is, 00000, and a playback status 12-12, that is, paused, are included.

S112: The control device requests the streaming media data of the virtual scene from the streaming media playback address in response to the failure prompt message.

After receiving the failure prompt message, the control device will determine that the playback device cannot directly play the streaming media data at present; and at this moment, the control device will access the streaming media playback address, pull the streaming media data from the streaming media playback address, to process the streaming media data and then forward same to the playback device, to ensure that the streaming media data can be played properly on the playback device.

S113: The control device converts the streaming media data according to a sharing service standard supported by the playback device to obtain converted media data.

And the control device converts the requested streaming media data according to the sharing service standard supported by the playback device, namely, converting into data which may be played normally and complies with the sharing service standard supported by the playback device, and takes the converted media data as converted media data.

Exemplarily, when the playback device supports the DLNA standard, the control device may convert the streaming media data according to the DLNA standard to obtain the converted media data of the DLNA standard which may be played by the playback device.

S114: The playback device receives the converted media data returned by the control device for the failure prompt message, and plays the converted media data.

The control device transmits the converted media data to the playback device, so that the presentation of the streaming media data of the virtual scene at the time of loading is realized by the converted media data.

It may be understood that when the streaming media data does not comply with the protocol service standard supported by the playback device, the control device can act as a "transfer station" for the streaming media data, pull the streaming media data by itself and convert same into converted media data which complies with the sharing service standard supported by the playback device, thus helping to improve the playing success rate of the streaming media data when the virtual scene is loaded, thereby further expanding the scope of the device supporting the virtual scene loading.

In some embodiments of this disclosure, after the cloud device loads, in response to the loading instruction, the virtual scene to obtain streaming media data corresponding to the virtual scene, and stores the streaming media data into the streaming media playback address, the method may further include the following processing: The control device transmits, in response to a control operation for a virtual object in the virtual scene, a control instruction for the virtual object to the cloud device. The cloud device controls the virtual object to perform the control event in response to the control instruction.

That is, the control device detects whether a user performs a control operation on the virtual object, and after detecting the control operation, generates a control instruction corresponding to the control operation, and transmits the control instruction to the cloud device via the network. A cloud device receives a control instruction transmitted by a control device for a virtual object in a virtual scene, and controls the virtual object in the virtual scene to realize a response to the control instruction. In this process, the cloud device will continuously generate the latest streaming media data of the virtual scene and store same in the streaming media playback address; and the playback device requests the latest streaming media data of the virtual scene from the streaming media playback address and plays the latest streaming media data.

It should be noted that the control instruction is used for indicating a cloud device to control the virtual object to perform a control event corresponding to a control operation. Control events include at least an event that controls the virtual object to move in the virtual scene, and an event that controls the virtual object to interact with other objects in the virtual scene, for example, controlling the virtual object to run in the virtual scene and controlling the virtual object to pick up a virtual prop in the virtual scene.

The control operation may refer to a user operating a physical button and a rocker on the control device, and may also refer to rotating the control device over an angle threshold (for example, rotating the annular somatosensory device over 90 degrees), and the embodiments of this disclosure are not limited herein.

It may be understood that the control device can convert the control operation of the user into a control instruction and transmit same to the cloud device, and the cloud device controls the virtual object in the virtual scene according to the control instruction, to provide the user with the ability to interact with the virtual scene and enable the streaming media data of the virtual scene played by the playback device to be updated.

In some embodiments of this disclosure, before a cloud device generates a streaming media playback address of a first protocol in response to an address pull request transmitted by a control device, the method may further include the following processing: The control device transmits an application list pull request to the cloud device. The cloud device acquires, in response to the application list pull request, an application list corresponding to the control device, and returns the application list to the control device. A control device encapsulates, according to a sharing service standard supported by the playback device, the application list to obtain a media file, and transfers the media file to the playback device. The playback device plays the media file. The control device filters, in response to a selection operation for the media file displayed by the playback device, a target application from the application list, and determines an application scene corresponding to the target application as the virtual scene.

In the embodiment of this disclosure, different applications have different virtual scenes, and the control device also needs to display different applications for the user to make an application selection by the user to determine the virtual scene to be loaded. In this case, the control device may first transmit an application list pull request to the cloud device, and the cloud device receives the application list pull request transmitted by the control device. The cloud device can inquire the application corresponding to the control device from the application library according to the device identification of the control device contained in the application list pull request or the identity information corresponding to the user, that is, obtaining the application that the control device can run, and integrate these applications into the application list and transmit same to the control device. The control device receives an application list returned by the cloud device for the application list pull request. Then, the control device encapsulates the application list according to the sharing service standard to obtain a media file complying with the sharing service standard and transmits the media file to the playback device via a network. The playback device receives the media file conforming to the sharing service standard transmitted by the control device. Finally, when the control device detects that the user performs a selection operation on the media file, an application corresponding to the selected part (such as an icon and text) in the media file is determined as a target application, and an application scene of the target application is determined as a virtual scene to be loaded. In this way, the control device can determine the virtual scene to be loaded.

It should be noted that the application list pull request may be generated and transmitted after the control device accesses the network via the wireless connection module, or may be generated and transmitted after an operation for triggering the pull application list is performed on the control device by a user (for example, clicking and selecting an icon of a game), and the embodiment of this disclosure is not limited herein.

It may be understood that the application list may include a cloud gaming application, and may also include a VR application running on a cloud device for improving the life experience of a user (such as a virtual changing application and a virtual home wear application), a design application for a three-dimensional figure, and the like, and the embodiments of this disclosure are not herein.

It will be appreciated that the control device may provide the user with an application list via the media file by packaging the application list pulled from the cloud device as a media file conforming to the sharing service standard supported by the playback device and playing the media file by the playback device, so that the user can view the application list and make an application selection, while also improving the amount of information that may be provided by the playback device.

In some embodiments of this disclosure, the control device includes a display screen and a physical button, and at this moment, after the control device receives an application list returned by the cloud device for the application list pull request, the method may further include the following processing: displaying the application list in the display screen; and filtering, in response to a selection operation for the application list displayed by the display screen, the target application from the application list, and determining the application scene corresponding to the target application as the virtual scene, the selection operation being received by the physical button.

Exemplarily, FIG. 13 is an appearance diagram of a control handle (one implementation of a control device) provided by an embodiment of this disclosure. On the control handle 13-1, a display screen 13-11 and physical buttons 13-12 are provided, and after obtaining the application list, the control handle 13-1 can directly display the application list on the display screen 13-11 for the user to select. When the user performs a selection operation on the control handle 13-1 through the physical button 13-12, the control handle determines a target application from the applications provided in the application list in response to the selection operation.

It will be appreciated that the control device directly displays the application list on its own display screen to skip the encapsulation for the application list, thereby saving the computational resources required in encapsulating the application list, and enabling presentation of the application list with less computational resources.

In some embodiments of this disclosure, when the control device includes a display screen and physical buttons, before a cloud device generates a streaming media playback address of a first protocol in response to an address pull request transmitted by a control device, the method may further include the following processing: The control device displays names of a plurality of candidate devices in a same wireless local area network as the control device in the display screen. The control device selects a playback device from the plurality of candidate devices in response to a selection operation for the plurality of candidate devices.

That is, the control device obtains names of candidate devices in the same wireless local area network, and displays the obtained names in a display screen of the control device to provide the user with the currently available devices. Then, the control device determines a device selected by the selection operation among the plurality of candidate devices as a playback device in response to the user's device selection operation. In this way, a suitable playback device may be selected according to the user's requirements.

Of course, in other embodiments, the playback device may be automatically chosen by the control device from a plurality of candidate devices, for example, a device supporting the second protocol among the candidate devices is determined to be a playback device. In this way, an automated selection of the playback device may be achieved, resulting in a faster access to the playback device.

In some embodiments of this disclosure, after the determining the playback device from the plurality of candidate devices in response to a selection operation for the plurality of candidate devices, the method further includes the following processing: transmitting a protocol acquisition request to the playback device; receiving a plurality of candidate protocols returned by a playback device for a protocol acquisition request; and determining the RTSP of the plurality of candidate protocols as the first protocol.

In an embodiment of this disclosure, a playback device supports at least a RTSP and a HTTP, and the playback device determines all the protocols supported thereby as a plurality of candidate protocols, so that the plurality of candidate protocols at least include a RTSP and a HTTP. Since the RTSP can transmit without specifying the size of streaming media data compared with the HTTP, the control device directly determines the RTSP as the first protocol to start the loading process of the virtual scene.

It should be noted that in some embodiments, the playback device may not support the RTSP, at which time the control device may generate a "virtual scene cannot be loaded" prompt message for the playback device and display the prompt message on the display screen.

In some embodiments of this disclosure, the control device includes a wireless connection module, and therefore, transmits, in response to a loading trigger operation on the virtual scene, a media projection request corresponding to a local media file to a playback device, which may be achieved by the following processing: transmitting, in response to the loading trigger operation on the virtual scene, the media projection request corresponding to an infinite local media file (i.e., a media file having infinite duration) for the playback device according to a preset protocol standard supported by the playback device, the preset protocol standard may be a protocol standard developed by the brand to which the playback device belongs. It should be noted that both the preset protocol standard and the sharing service standard are realized through a wireless connection module, that is, a protocol stack of the preset protocol standard and a protocol stack of a control point and a media server in the sharing service standard can both be realized by the wireless connection module, and in this way, streaming media data may be presented in a projection manner by merely modifying a protocol supported by a control device, so that the virtual scene loading may be realized without modifying a protocol of a playback device.

In the following, exemplary applications of the embodiments of this disclosure in a practical application scene will be described.

The embodiment of this disclosure is implemented in the scene of implementing the running of a cloud gaming on a smart television (playback device) which does not support a cloud gaming client. In the embodiment of this disclosure, a gamepad (a control device) provided with a WiFi module (a wireless connection module) realizes the protocol stack of a control point and a media server supported by a smart television; a liquid crystal screen (a display screen) is added on the gamepad, and the name of a media player found in a local area network, that is, the name of an intelligent mobile phone or a smart television, is displayed on the smart television by selecting and playing keys on the gamepad.

Figure 14:
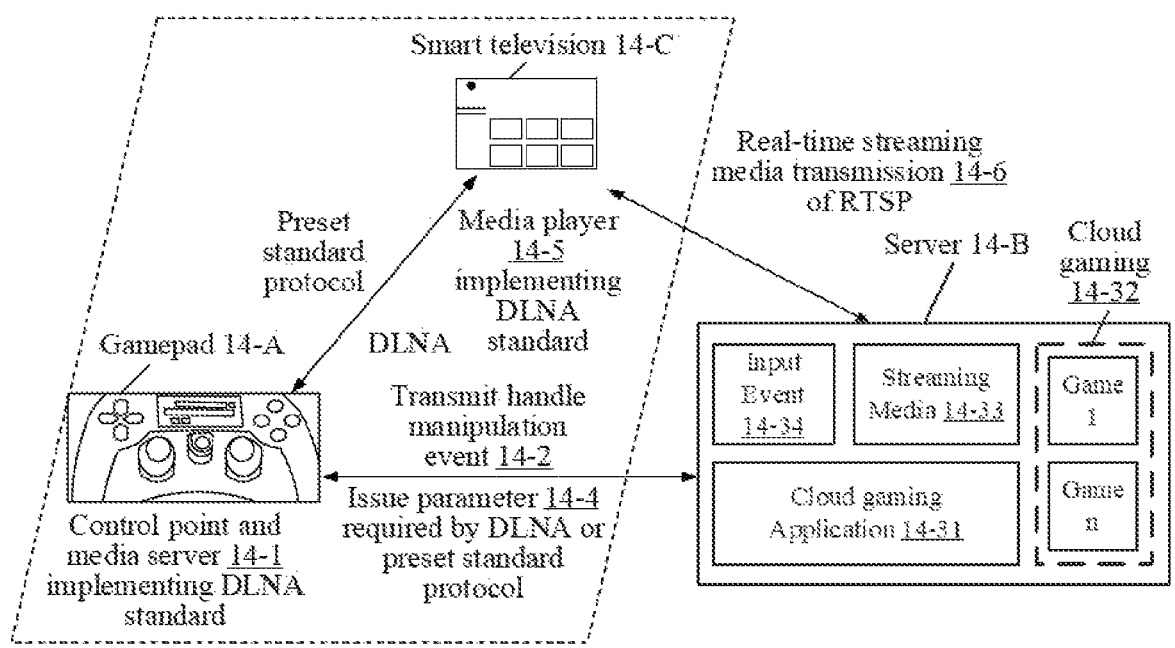
FIG. 14 is an operation diagram of cloud gaming provided by an embodiment of this disclosure.

FIG. 14 is an operation diagram of a cloud gaming provided by an embodiment of this disclosure. Referring to FIG. 14, a control point and a media server 14-1 implementing the DLNA standard by a gamepad 14-A transmits a handle manipulation event 14-2 to a server 14-B (a cloud device) on an upstream channel. The server 14-B is configured to run a cloud gaming application 14-31 and a cloud gaming 14-32 (for example, games 1 to n), generate streaming media 14-33, and process input events 14-34. On the down channel, the server 14-B issues parameters 14-4 required by the DLNA or preset standard protocol to the gamepad 14-A. The gamepad 14-A interacts with the smart television 14-C based on DLNA or a preset standard protocol, and a media player 14-5 implementing the DLNA standard by the smart television 14-C acquires video and audio (streaming media data) of a cloud gaming (a virtual scene) and plays same via real-time streaming media transmission 14-6 of the RTSP.

It may be understood that the gamepad can also have the functions of WiFi connection and password input; after completing password input to access a network, a cloud gaming list (an application list) is pulled from a server, and the cloud gaming list is encapsulated into a media object (media file) in the DLNA standard via the DLNA standard, and is provided for a media player in a smart television to play; and under a preset protocol standard, the cloud gaming needs to be encapsulated into a media file, and a playback address (a local file address) is exchanged for a streaming media playback address. The streaming media playback address provides a picture of a window of the game scene in running and the corresponding audio.

Exemplarily, FIG. 15 is a process diagram of encapsulating a game list into a media object in media content service of DLNA provided by an embodiment of this disclosure. After receiving the game list, the gamepad uses a playback address 15-11 in the detailed data 15-1 of the game object, namely, the address of rtsp://xxxxx, for the address 15-21 in the media object 15-2 in the DLNA standard, namely, the address of http://xxxxx is replaced to complete the encapsulation of the game list.

FIG. 16 is a diagram of replacing a playback address of a preset protocol standard with a streaming media playback address provided by a cloud device provided by an embodiment of this disclosure. The gamepad extracts the playback address 16-11 of the RTSP from the detailed data 16-1 of the game object, and then replaces the playback address 16-21 in the preset protocol standard 16-2 with the playback address 16-11 of the RTSP using the playback address 16-11 of the RTSP.

When using a preset standard protocol to perform projection playing, the audio-video stream of the cloud gaming needs to be seen as an infinite media file to be played to the smart television. The process includes the following steps:

Step 1: The gamepad discovers a device in the local area network according to a preset standard protocol, that is, notifying the local area network of what kind of service may be provided by other devices via a UDP multicast packet, and at the same time discovers a smart television supporting the preset standard protocol, and pulls a RTSP playback address (a streaming media playback address) from the server for transmitting a cloud gaming picture and game audio run by the server.

Step 2: The gamepad displays the name of the device (candidate device) on the liquid crystal screen so that the user selects the device to be projected.

Step 3: The gamepad projects an infinite media file (a local media file) to the smart television according to a preset standard protocol; and the smart television calls an attribute acquisition interface in the preset standard protocol to acquire the size of the media file and a playback address (a local file address), where the playback address will be replaced by the gamepad with the RTSP address pulled from the server in step 1.

Step 4: The gamepad calls a play interface (a loading instruction) in the preset standard protocol to trigger the smart television to start playing data obtained from a RTSP address, the address being a standard streaming media protocol, and encodes the audio and video in real time into the smart television for playing.

Step 5: If the playback is normal, an input event (a control instruction) of the gamepad will be transmitted to the cloud device to indicate the server to control a character in the cloud gaming (performing a control event); if the playback fails, that is, a callback event of the gamepad is that the playback status is wrong, a DLNA standard (sharing service standard) is switched for playback.

The modification of DLNA playing a cloud gaming picture has the following points: according to the DLNA standard, the HTTP and the RTSP can both support media transmission; a DLNA control point and a media server are realized on a gamepad, that is, converting the pulled game list into a media file complying with the DLNA standard to be recognized and played by a smart television supporting the DLNA standard. The gamepad implements the control point and media server standards in the DLNA, as a control point to control the playback and manipulation of a cloud gaming, as a media server to present a cloud gaming picture (converted media data) to a media player, and adds a game event control service for adapting different handle events for different cloud gaming.

Exemplarily, based on FIG. 1 and referring to FIG. 17, FIG. 17 is a diagram of a DLNA standard to be implemented by a gamepad provided by an embodiment of this disclosure. The gamepad also needs to implement the control point 1-1, the media server 1-2, and the media player 1-3, except that in the media server 1-2, the game event control service 17-1 needs to be implemented.

Figure 18:
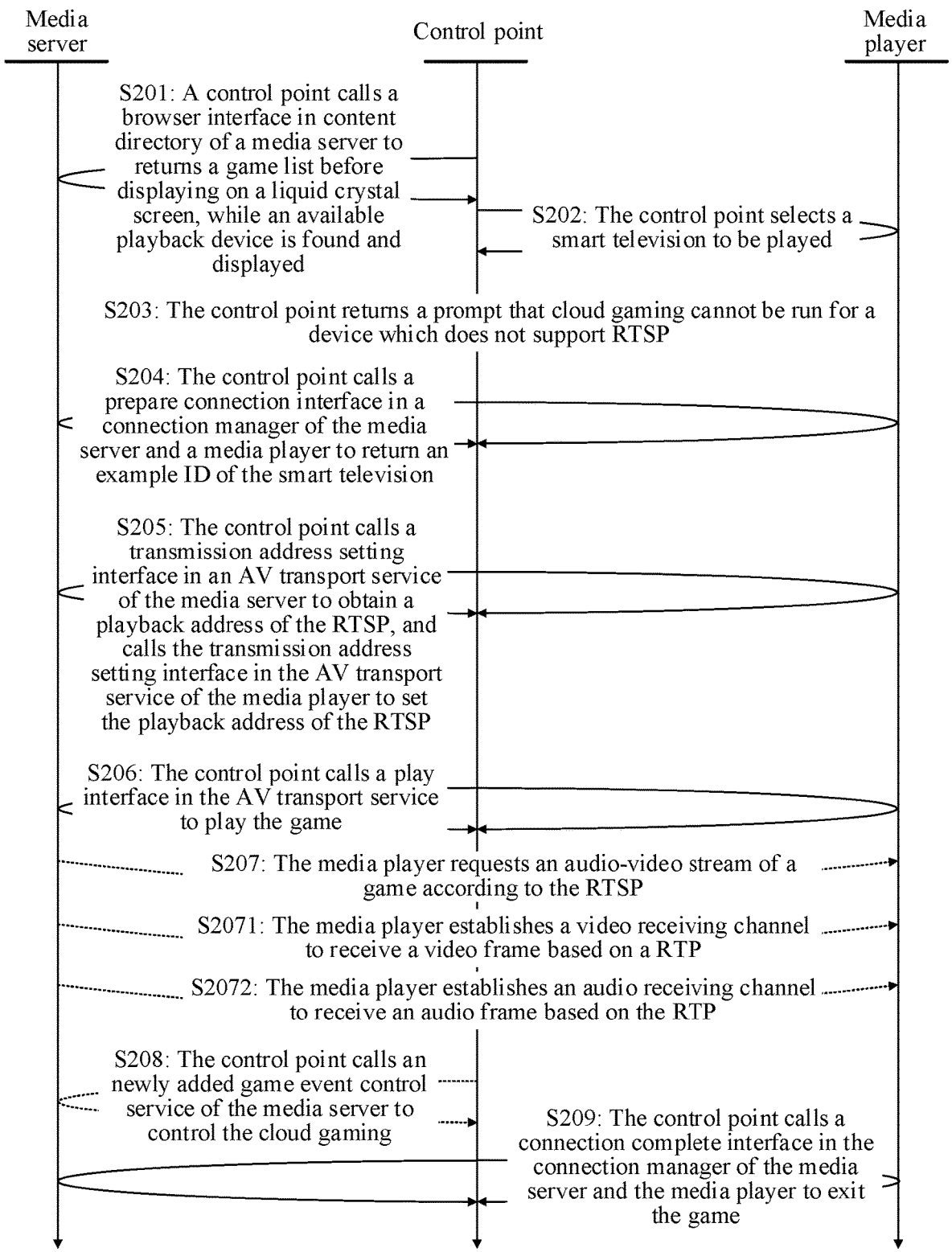
FIG. 18 is a diagram of a running process of cloud gaming provided by an embodiment of this disclosure.

Hereinafter, the running process of the control point, the media server, and the media player will be described in conjunction with the running process of the cloud gaming. FIG. 18 is a diagram of a running process of a cloud gaming provided by an embodiment of this disclosure. Referring to FIG. 18, the process includes the following steps:

S201: The control point calls a browser interface in the content directory (ContentDirectroy:Browser) of the media server to returns the game list before displaying on the liquid crystal screen, while the available playback devices (candidate devices) are found and displayed.

It should be noted that the content directory of the media server on the gamepad is not limited to only displaying audio and video files, but also provides relevant information about a game, and pulls information about a game list which the server has installed and can run, for example, a name, an icon, and an introduction to encapsulate same into a media object, and the media object indicates to the DLNA player that only the RTSP is supported, and the HTTP is not supported.

S202: The control point selects the smart television to be played.

The control point calls a protocol information acquisition interface (ConnectionManager:GetProtocolInfo) in the connection manager to return available device protocols and supported media formats. The HTTP and RTSP are typically returned and the RTSP is automatically selected.

S203: The control point returns a prompt that the cloud gaming cannot be run for the device which does not support the RTSP.

S204: The control point calls a preparation connection interface in the connection manager (ConnectionManager:PrepareConnevtion) of the media server and the media player to return the example ID of the smart television.

It should be noted that a control point can control a plurality of media players, and needs to be distinguished by an example ID, namely, a gamepad can play a game picture on a plurality of smart televisions.

S205: The control point calls a transmission address setting interface in an AV transport service (AVTransport:SetAVTransportURI ( )) of the media server to obtain a playback address of the RTSP, and calls the transmission address setting interface in the AV transport service of the media player to set the playback address of the RTSP.

S206: The control point calls a play interface in the AV transport service (AVTransport:Play( )) to play the game.

After the cloud gaming is played, the video and audio of the game picture are compressed and available in real time, and the audio-video stream can be stored with rtsp://xxx address.

S207: The media player requests the audio-video stream of the game according to the RTSP.

The media server acquires encoding information about the audio and video according to the RTSP such as a video format, a compression specification, a code rate, and a resolution, a sampling rate of the audio, the number of compression channels, and the number of compression bits. An audio stream and a video stream are then obtained based on the following two steps:

S2071: The media player establishes a video receiving channel to receive a video frame based on a real-time transport protocol (RTP).

S2072: The media player establishes an audio receiving channel to receive an audio frame based on the RTP.

S208: The control point calls the newly added game event control service of the media server to control the cloud gaming.

The gamepad pulls handle event configuration information of the server, such as mapping direction keys to movement in four directions or to direction keys of a keyboard, to realize the control of the cloud gaming.

S209: The control point calls a connection completion interface in the connection manager (ConnectionManager: ConnectionComplete) of the media server and the media player to exit the game.

Thereafter, if it is necessary to restart the game, the above processing steps are re-followed to start a new round of cloud gaming.

It is to be understood that in the embodiments of this disclosure, relating to relevant data of user information such as a game list and identity information, user permission or consent needs to be obtained when the embodiments of this disclosure are applied to specific products or technologies; and collection, use, and processing of the relevant data needs to comply with relevant laws and regulations and standards of relevant countries and regions.

The following continues to illustrate an exemplary structure of a first apparatus 555 for virtual scene loading provided by the embodiments of this disclosure being implemented as a software module. In some embodiments, as shown in FIG. 4, the software module stored in the first apparatus 555 for virtual scene loading of a first memory 550 may include:

a first receiving module 5551, configured to receive a streaming media playback address of a first protocol returned by a cloud device for an address pull request;

a first transmission module 5552, configured to transmit, in response to a loading trigger operation on the virtual scene, a media projection request corresponding to a local media file to a playback device, and transmit a loading instruction indicating to start loading the virtual scene to the cloud device;

a parameter generation module 5553, configured to acquire an initial file parameter corresponding to the local media file in response to a parameter acquisition request returned by the playback device for the media projection request; replace a local file address of a second protocol in the initial file parameter using the streaming media playback address to obtain a target file parameter, the streaming media playback address being used for providing streaming media data of the virtual scene generated by the cloud device in responding to the loading instruction; and the first transmission module 5552, further configured to return the target file parameter to the playback device, the target file parameter being used for providing the streaming media data to the playback device before playing.

In some embodiments of this disclosure, the parameter generation module 5553 is further configured to: locate a link address field from the initial file parameter; and locate, according to a protocol key word of the second protocol, the local file address of the second protocol from original content corresponding to the link address field in the initial file parameter, the local file address being a playback address corresponding to the local media file.

In some embodiments of this disclosure, the parameter generation module 5553 is further configured to: delete the local file address from the original content corresponding to the link address field in the initial file parameter to obtain remaining content corresponding to the link address field; insert the streaming media playback address into the remaining content according to location information about the local file address in the original content to obtain latest content corresponding to the link address field; and replace the local file address of the second protocol in the initial file parameter by integrating the link address field, the latest content, other fields in the initial file parameter, and field content corresponding to the other fields to obtain the target file parameter.

In some embodiments of this disclosure, the first apparatus 555 for virtual scene loading further includes a data conversion module 5554.

The first receiving module 5551 is further configured to receive a failure prompt message returned by the playback device, the failure prompt message being used for prompting a playback failure of the streaming media data.

The data conversion module 5554 is configured to: request the streaming media data of the virtual scene from the streaming media playback address in response to the failure prompt message; and convert the streaming media data according to a sharing service standard supported by the playback device to obtain converted media data.

The first transmission module 5552 is further configured to transmit the converted media data to the playback device.

In some embodiments of this disclosure, the first transmission module 5552 is further configured to transmit, in response to a control operation for a virtual object in the virtual scene, a control instruction for the virtual object to the cloud device, the control instruction being used for indicating the cloud device to control the virtual object to perform a control event corresponding to the control operation, and the control event including at least an event that controls movement of the virtual object in the virtual scene, and an event that controls interaction of the virtual object with other objects in the virtual scene.

In some embodiments of this disclosure, the first apparatus 555 for virtual scene loading further includes an information selection module 5555. The first transmission module 5552 is further configured to transmit an application list pull request to the cloud device.

The first receiving module 5551 is further configured to receive an application list returned by the cloud device for the application list pull request.

The data conversion module 5554 is further configured to encapsulate, according to a sharing service standard supported by the playback device, the application list to obtain a media file, and transfer the media file to the playback device.

The information selection module 5555 is configured to filter, in response to a selection operation for the media file displayed by the playback device, a target application from the application list, and determine an application scene corresponding to the target application as the virtual scene.

In some embodiments of this disclosure, the control device includes a display screen and physical buttons; and the first apparatus 555 for virtual scene loading further includes a display control module 5556 configured to present the application list in the display screen.

The information selection module 5555 is further configured to filter, in response to a selection operation for the application list displayed by the display screen, the target application from the application list, and determine the application scene corresponding to the target application as the virtual scene, the selection operation being received by the physical button.

In some embodiments of this disclosure, the display control module 5556 is further configured to display names of a plurality of candidate devices in a same wireless local area network as the control device in the display screen.

The information selection module 5555 is further configured to determine the playback device from the plurality of candidate devices in response to a selection operation for the plurality of candidate devices.

In some embodiments of this disclosure, the first transmission module 5552 is further configured to transmit a protocol acquisition request to the playback device.

The first receiving module 5551 is further configured to receive a plurality of candidate protocols returned by the playback device for the protocol acquisition request. A plurality of candidate protocols include at least a RTSP and a HTTP.

The information selection module 5555 is further configured to determine the RTSP of the plurality of candidate protocols as the first protocol.

In some embodiments of this disclosure, the control device includes a wireless connection module. The first transmission module 5552 is further configured to transmit, in response to the loading trigger operation on the virtual scene, the media projection request corresponding to an infinite local media file for the playback device according to a preset protocol standard supported by the playback device, the preset protocol standard and the sharing service standard being both implemented through the wireless connection module.

The following continues to illustrate an exemplary structure of a second apparatus 455 for virtual scene loading provided by the embodiments of this disclosure being implemented as a software module. In some embodiments, as shown in FIG. 5, the software module stored in the second apparatus 455 for virtual scene loading of a second memory 450 may include:

- a second receiving module 4551, configured to receive a media projection request transmitted by a control device for a local media file;
- a second transmission module 4552, configured to return a parameter acquisition request to the control device in response to the media projection request;
- a data request module 4553, configured to parse a streaming media playback address of a first protocol from a target file parameter returned by the control device for the parameter acquisition request, the target file parameter being obtained by replacing a local file address of a second protocol in an initial file parameter with the streaming media playback address, and the initial file parameter corresponding to the local media file; and pull streaming media data of the virtual scene from the streaming media playback address; and
- a data playback module 4554, configured to play the streaming media data.

In some embodiments of this disclosure, the second transmission module 4552 is further configured to transmit, in response to a playback failure of the streaming media data, a failure prompt message to the control device, the failure prompt message being used for prompting the playback failure of the streaming media data.

The second receiving module 4551 is further configured to receive converted media data returned by the control device for the failure prompt message.

The data playback module 4554 is further configured to play the converted media data, the converted media data being obtained by converting the streaming media data requested by the control device from the streaming media playback address according to a sharing service standard supported by the playback device.

In some embodiments of this disclosure, the second receiving module 4551 is further configured to receive a media file transmitted by the control device, the media file being obtained by encapsulating an application list pulled from a cloud device according to a sharing service standard supported by the playback device.

The data playback module 4554 is further configured to play the media file.

The following continues to illustrate an exemplary structure of a third apparatus 255 for virtual scene loading provided by the embodiments of this disclosure being implemented as a software module. In some embodiments, as shown in FIG. 6, the software module stored in the third apparatus 255 for virtual scene loading of a third memory 250 may include:

- an address generation module 2551, configured to generate a streaming media playback address of a first protocol in response to an address pull request transmitted by a control device;
- a third transmission module 2552, configured to return the streaming media playback address to the control device, the streaming media playback address being used for replacing a local file address of a second protocol in an initial file parameter to obtain a target file parameter, and the initial file parameter corresponding to a local media file of the control device;
- a third receiving module 2553, configured to receive a loading instruction transmitted by the control device for indicating to start loading the virtual scene; and
- a scene loading module 2554, configured to load, in response to the loading instruction, the virtual scene to obtain streaming media data corresponding to the virtual scene, and store the streaming media data into the streaming media playback address.

In some embodiments of this disclosure, the third receiving module 2553 is further configured to receive a control instruction transmitted by the control device for a virtual object in the virtual scene, the control instruction being used for indicating a cloud device to control the virtual object to perform a control event corresponding to a control operation.

The scene loading module 2554 is further configured to control the virtual object to perform the control event in response to the control instruction, the control event including at least an event that controls movement of the virtual object in the virtual scene, and an event that controls interaction of the virtual object with other objects in the virtual scene.

In some embodiments of this disclosure, the third receiving module 2553 is further configured to receive an application list pull request transmitted by the control device.

The scene loading module 2554 is further configured to acquire an application list corresponding to the control device in response to the application list pull request.

The third transmission module 2552 is further configured to return the application list to the control device.

The embodiments of this disclosure provide a computer program product or computer program including computer-executable instructions, the computer-executable instructions being stored in a non-transitory computer-readable storage medium. The first processor (processing circuitry) of the control device reads the computer-executable instructions from a computer-readable storage medium and executes same to implement the virtual scene loading method on a control device side provided by the embodiments of this disclosure; the second processor (processing circuitry) of a playback device reads the computer instructions from the computer-readable storage medium and executes same to implement the virtual scene loading method on a playback device side provided by the embodiments of this disclosure; and a third processor (processing circuitry) of a cloud device reads the computer instructions from the computer-readable storage medium and executes same to implement the virtual scene loading method on a cloud device side provided by the embodiments of this disclosure.

The embodiments of this disclosure provide a computer-readable storage medium storing computer-executable instructions, the computer-executable instructions, when executed by a first processor, causing the first processor to execute the virtual scene loading method on a control device side provided by the embodiments of this disclosure; when executed by a second processor, causing the second processor to execute the virtual scene loading method on a playback device side provided by the embodiments of this disclosure; when executed by a third processor, causing the third processor to execute the virtual scene loading method on a cloud device side provided by the embodiments of this disclosure.

In some embodiments, the computer-readable storage medium may be a memory such as FRAM, ROM, PROM, EPROM, EEPROM, flash memory, magnetic surface storage, optical disk, or CD-ROM; or various devices including one or any combination of the above memories.

In some embodiments, the computer-executable instructions may be written in any form of program, software, software module, script, or code, in any form of programming language, including compiled or interpreted languages, or declarative or procedural languages. They may be deployed in any form, including as stand-alone programs or as modules, assemblies, subroutines, or other units suitable for use in a computing environment.

As an example, the computer-executable instructions may, but need not, correspond to files in a file system, may be stored in a portion of a file that holds other programs or data, for example, in one or more scripts in a hyper-text markup language (HTML) document, in a single file dedicated to the program in question, or in multiple coordinated files (for example, files storing one or more modules, subroutines, or portions of code).

As an example, the computer-executable instructions may be deployed to execute on one computing device (control device, playback device, or cloud device), or on a plurality of computer devices located at one site, or on a plurality of computer devices distributed across a plurality of sites and interconnected by a communication network.

In an embodiment, a non-transitory computer-readable storage medium stores computer-readable instructions which, when executed by a computer device, cause the computer device to perform a virtual scene loading method that includes receiving a streaming media playback address of a cloud streaming service returned by a cloud device in response to an address pull request. The method further includes transmitting, in response to a loading trigger operation associated with a virtual scene, a media projection request corresponding to a local media file stored on the control device to a playback device, and transmitting a loading instruction indicating to start loading the virtual scene to the cloud device. The method further includes generating initial file parameters corresponding to the local media file in response to a parameter acquisition request returned by the playback device in response to the media projection request. The method further includes replacing a file address of the local media file in the initial file parameters with the streaming media playback address to obtain modified file parameters, the streaming media playback address providing streaming media data of the virtual scene generated by the cloud device in response to the transmitted loading instruction. The method further includes returning the modified file parameters to the playback device, the modified file parameters providing the streaming media playback address to the playback device instead of the initial file parameters corresponding to the local media file to enable the playback device to execute the media projection request by pulling streaming media data of the virtual scene from the streaming media playback address.

In an embodiment, a non-transitory computer-readable storage medium stores computer-readable instructions which, when executed by a computer device, cause the computer device to perform a a virtual scene loading method that includes receiving, from a control device, a media projection request corresponding to a local media file stored on the control device. The method further includes returning a parameter acquisition request to the control device in response to the media projection request, and parsing a streaming media playback address of a cloud streaming service from modified file parameters returned by the control device in response to the parameter acquisition request, the modified file parameters being obtained by replacing a file address of the local media file in initial file parameters with the streaming media playback address. The method further includes pulling streaming media data of a virtual scene from the streaming media playback address, and playing the streaming media data.

In summary, according to the embodiments of this disclosure, when a playback device does not support a cloud gaming client, streaming media data of a virtual scene may also be played, to realize the virtual scene loading, and finally the range of the device supporting the virtual scene loading is expanded. When the streaming media data does not comply with the protocol service standard supported by the playback device, the control device can act as a "transfer station" for the streaming media data, pull the streaming media data by itself and convert same into converted media data which complies with the sharing service standard supported by the playback device, thus helping to improve the playing success rate of the streaming media data when the virtual scene is loaded, thereby further expanding the scope of the device supporting the virtual scene loading.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A virtual scene loading method executed by a control device, comprising:
   receiving a streaming media playback address of a first protocol returned by a cloud device in response to an address pull request;
   transmitting, in response to a loading trigger operation associated with a virtual scene, a media projection request corresponding to a local media file to a playback device, and transmitting a loading instruction indicating to start loading the virtual scene to the cloud device;
   generating initial file parameters corresponding to the local media file in response to a parameter acquisition request returned by the playback device in response to the media projection request;
   replacing a local file address of a second protocol in the initial file parameters with the streaming media playback address to obtain modified file parameters, the streaming media playback address providing streaming media data of the virtual scene generated by the cloud device in response to the transmitted loading instruction; and
   returning the modified file parameters to the playback device, the modified file parameters providing the streaming media playback address to the playback device.

2. The method according to claim 1, wherein the method further comprises:
   locating a link address field in the initial file parameters; and
   locating, using a key word, a file address of the local media file in the link address field of the initial file parameters, the file address of the local media file being a playback address corresponding to the local media file.

3. The method according to claim 2, wherein the replacing the file address of the local media file in the initial file parameters comprises:
   deleting the file address of the local media file from the link address field in the initial file parameters to obtain remaining content corresponding to the link address field;
   inserting the streaming media playback address into the remaining content according to location information of the deleted file address of the local media file to obtain updated content of the link address field; and
   integrating the updated content of the link address field, other fields in the initial file parameters, and field content corresponding to the other fields to obtain the modified file parameters.

4. The method according to claim 1, wherein the method further comprises:
   receiving a failure prompt message returned by the playback device, the failure prompt message indicating a playback failure of the streaming media data;
   requesting the streaming media data of the virtual scene from the streaming media playback address in response to the failure prompt message;
   converting the streaming media data according to a sharing service standard supported by the playback device to obtain converted media data; and
   transmitting the converted media data to the playback device.

5. The method according to claim 1, wherein the method further comprises:
   transmitting, to the cloud device in response to receiving a control operation associated with a virtual object in the virtual scene, a control instruction corresponding to the virtual object, the control instruction indicating the cloud device to control the virtual object to perform a control event corresponding to the control operation,
   the control event comprising at least an event that controls movement of the virtual object in the virtual scene, or an event that controls interaction of the virtual object with other objects in the virtual scene.

6. The method according to claim 1, wherein the method further comprises:
   transmitting an application list pull request to the cloud device;
   receiving an application list returned by the cloud device in response to the application list pull request;
   encapsulating, according to a sharing service standard supported by the playback device, the application list to obtain a media file, and transferring the media file to the playback device; and
   filtering, in response to a selection operation associated with the media file displayed by the playback device, a target application from the application list, and determining an application scene corresponding to the target application as the virtual scene.

7. The method according to claim 1, wherein
   the first protocol is associated with a cloud streaming service, and
   the local file address of the second protocol is a file address of the local media file.

8. The method according to claim 1, wherein the modified file parameters provide the streaming media playback address to the playback device instead of the initial file parameters corresponding to the local media file to enable the playback device to execute the media projection request by pulling the streaming media data of the virtual scene from the streaming media playback address.

9. The method according to claim 1, wherein the method further comprises:
   transmitting a protocol acquisition request to the playback device;
   receiving a plurality of candidate protocols returned by the playback device in response to the protocol acquisition request, the plurality of candidate protocols comprising at least a real time streaming protocol (RTSP) and a hypertext transfer protocol (HTTP); and
   determining the RTSP as the first protocol.

10. The method according to claim 4, wherein
    the control device comprises a wireless connection module; and
    the transmitting, in response to the loading trigger operation, the media projection request comprises:
    transmitting, in response to the loading trigger operation, the media projection request corresponding to the local media file having infinite duration to the playback device according to a preset protocol standard supported by the playback device, the preset protocol standard and the sharing service standard being both implemented through the wireless connection module.

11. A virtual scene loading method executed by a playback device, comprising:
receiving, from a control device, a media projection request corresponding to a local media file;
returning a parameter acquisition request to the control device in response to the media projection request;
parsing a streaming media playback address of a first protocol from modified file parameters returned by the control device in response to the parameter acquisition request, the modified file parameters being obtained by replacing a local file address of a second protocol in initial file parameters with the streaming media playback address, and the initial file parameter corresponding to the local media file; and
pulling streaming media data of a virtual scene from the streaming media playback address, and playing the streaming media data.

12. The method according to claim 11, wherein the method further comprises:
transmitting, in response to a playback failure of the streaming media data, a failure prompt message to the control device, the failure prompt message indicating the playback failure of the streaming media data; and
receiving converted media data returned by the control device in response to the failure prompt message, and playing the converted media data,
the converted media data having been obtained by converting the streaming media data from the streaming media playback address according to a sharing service standard supported by the playback device.

13. The method according to claim 11, wherein the method further comprises:
receiving, according to a sharing service standard supported by the playback device, a media file transmitted by the control device, the media file being obtained by encapsulating an application list pulled from a cloud device; and
displaying the media file.

14. The method according to claim 11, wherein
the first protocol is associated with a cloud streaming service, and
the local file address of the second protocol is a file address of the local media file.

15. The method according to claim 11, wherein the modified file parameters provide the streaming media playback address to the playback device instead of the initial file parameters corresponding to the local media file to enable the playback device to execute the media projection request by pulling the streaming media data of the virtual scene from the streaming media playback address.

16. A control device apparatus for virtual scene loading, the apparatus comprising:
processing circuitry configured to
receive a streaming media playback address of a first protocol returned by a cloud device in response to an address pull request;
transmit, in response to a loading trigger operation associated with a virtual scene, a media projection request corresponding to a local media file to a playback device, and transmit a loading instruction indicating to start loading the virtual scene to the cloud device;
generate initial file parameters corresponding to the local media file in response to a parameter acquisition request returned by the playback device in response to the media projection request;
replace a local file address of a second protocol in the initial file parameters with the streaming media playback address to obtain modified file parameters, the streaming media playback address providing streaming media data of the virtual scene generated by the cloud device in response to the transmitted loading instruction; and
return the modified file parameters to the playback device, the modified file parameters providing the streaming media playback address to the playback device.

17. The apparatus according to claim 16, wherein the processing circuitry is further configured to:
locate a link address field in the initial file parameters; and
locate, using a key word, a file address of the local media file in the link address field of the initial file parameters, the file address of the local media file being a playback address corresponding to the local media file.

18. The apparatus according to claim 17, wherein the processing circuitry is further configured to:
delete the file address of the local media file from the link address field in the initial file parameters to obtain remaining content corresponding to the link address field;
insert the streaming media playback address into the remaining content according to location information of the deleted file address of the local media file to obtain updated content of the link address field; and
integrate the updated content of the link address field, other fields in the initial file parameters, and field content corresponding to the other fields to obtain the modified file parameters.

19. The apparatus according to claim 16, wherein
the first protocol is associated with a cloud streaming service, and
the local file address of the second protocol is a file address of the local media file.

20. The apparatus according to claim 16, wherein the modified file parameters provide the streaming media playback address to the playback device instead of the initial file parameters corresponding to the local media file to enable the playback device to execute the media projection request by pulling the streaming media data of the virtual scene from the streaming media playback address.

* * * * *